(12) United States Patent
Wang et al.

(10) Patent No.: US 11,830,109 B2
(45) Date of Patent: Nov. 28, 2023

(54) COLOR GENERATION SYSTEM, METHOD, AND APPARATUS FOR OBJECT TO BE DISPLAYED, DISPLAY DEVICE, AND MEDIUM

(71) Applicant: RIGOL TECHNOLOGIES (BEIJING), INC., Beijing (CN)

(72) Inventors: Hao Wang, Jiangsu (CN); Yue Wang, Jiangsu (CN); Tiejun Wang, Jiangsu (CN); Weisen Li, Jiangsu (CN)

(73) Assignee: RIGOL TECHNOLOGIES (BEIJING), INC., Beijing (CN)

( * ) Notice: Subject to any disclaimer, the term of this patent is extended or adjusted under 35 U.S.C. 154(b) by 4 days.

(21) Appl. No.: 17/785,058

(22) PCT Filed: Jul. 14, 2020

(86) PCT No.: PCT/CN2020/101774
§ 371 (c)(1),
(2) Date: Nov. 16, 2022

(87) PCT Pub. No.: WO2021/120611
PCT Pub. Date: Jun. 24, 2021

(65) Prior Publication Data
US 2023/0141349 A1    May 11, 2023

(30) Foreign Application Priority Data
Dec. 19, 2019   (CN) .......................... 201911320174.5

(51) Int. Cl.
*G06T 11/00*     (2006.01)
*G06T 7/70*      (2017.01)
(Continued)

(52) U.S. Cl.
CPC .............. *G06T 11/001* (2013.01); *G06T 7/70* (2017.01); *G06V 10/56* (2022.01); *G09G 3/3607* (2013.01);
(Continued)

(58) Field of Classification Search
CPC ..................... G06T 11/001; G06T 7/70; G06T 2207/10024; G06V 10/56;
(Continued)

(56) References Cited

U.S. PATENT DOCUMENTS 7,222,306 B2 *    5/2007   Kaasila ................. G06F 3/0488
                                                           715/800
2010/0103201 A1 *  4/2010   Nakanishi ............... G09G 5/02
                                                           345/87
(Continued)

FOREIGN PATENT DOCUMENTS

CN       101131401 B      7/2011
CN       106841730 A      6/2017
(Continued)

OTHER PUBLICATIONS

International Search Report issued by the China National Intellectual Property Administration (ISA/CN) in connection with International Application No. PCT/CN2020/101774, dated Oct. 14, 2020, pp. 1-5, with English-language translation.
(Continued)

*Primary Examiner* — Wesner Sajous
(74) *Attorney, Agent, or Firm* — CARTER, DELUCA & FARRELL LLP; George Likourezos

(57) ABSTRACT

Provided are a color generation system, method and apparatus of a to-be-displayed object, a display device and a medium. The color generation system of a to-be-displayed object includes a to-be-displayed object processing module, a color setting module and a color generation module. The
(Continued)

to-be-displayed object processing module is configured to preprocess a sampled to-be-displayed object, and determine to-be-displayed object information of the sampled to-be-displayed object according to the preprocessed sampled to-be-displayed object. The color setting module is configured to generate a to-be-displayed object color mapping table based on the to-be-displayed object information, and parse the to-be-displayed object information and color information in the to-be-displayed object color mapping table to obtain a subpixel information component of a display interface. The color generation module is configured to configure a display color of the sampled to-be-displayed object on the display interface according to the subpixel information component of the display interface.

19 Claims, 19 Drawing Sheets

(51) Int. Cl.
  *G06V 10/56* (2022.01)
  *G09G 3/36* (2006.01)
  *H04N 1/60* (2006.01)
  *G09G 5/06* (2006.01)
(52) U.S. Cl.
  CPC .............. *G06T 2207/10024* (2013.01); *G09G 2320/0666* (2013.01)
(58) Field of Classification Search
  CPC .... G09G 2320/0686; G09G 5/02; G09G 5/04; G09G 5/06; G09G 3/3607; G09G 5/30; G09G 2320/0666; G09G 2320/0271; G09G 2320/0276; G09G 2320/0285; G09G 2320/04; G09G 2320/06; G09G 2320/0626; G09G 2320/066; G09G 2320/0673; H04N 1/60; H04N 1/6019; H04N 1/6025; H04N 1/6041; H04N 1/6075; H04N 1/6077; H04N 5/445; H04N 5/57; H04N 9/3182; H04N 9/3188; H04N 9/44; H04N 9/64; H04N 9/73; H04N 9/77; H04N 11/20; H04N 13/15; H04N 13/324; G06F 3/0481; G06F 3/0482; G06F 3/04842
  USPC ......................................................... 345/593
  See application file for complete search history.

(56) References Cited

U.S. PATENT DOCUMENTS

2017/0124736 A1  5/2017 Bresser
2019/0080656 A1* 3/2019 Herranz ............... G09G 3/2003

FOREIGN PATENT DOCUMENTS

| CN | 107607781 A | 1/2018 |
| CN | 109001513 A | 12/2018 |
| JP | H08117200 A | 5/1996 |
| JP | 2001502415 A | 2/2001 |
| JP | 2008232968 A | 10/2008 |
| WO | 9744677 A1 | 11/1997 |

OTHER PUBLICATIONS

Written Opinion of the International Search Authority issued by the China National Intellectual Property Administration (ISA/CN) in connection with International Application No. PCT/CN2020/101774, dated Oct. 14, 2020, pp. 1-7, with English-language translation.
International Search Report issued by the China National Intellectual Property Administration (ISA/CN) in connection with International Application No. PCT/CN2020/101774, dated Oct. 14, 2020, pp. 1-4, with English-language translation.
Extended European Search Report issued by the European Patent Office in connection with International Application No. 20902322.5, dated Mar. 28, 2023.
Kuojun Yang, et al., "A Waveform Display Synchronization Method in Multi-channel Digital Three-Dimensional Oscilloscope", IEEE, pp. 1-7, 2019.
Japanese Office Action issued by the Japanese Patent Office in connection with International Application No. 2022-538238, dated Feb. 7, 2023. (English Translation Attached).

* cited by examiner

| Channel | Color Parameter | Sample Color | R Standard Value | G Standard Value | B Standard Value |
|---|---|---|---|---|---|
| 0 | 0 | | 255 | 0 | 0 |
| 1 | 28 | | 255 | 120 | 0 |
| 2 | 45 | | 255 | 192 | 0 |
| 3 | 60 | | 255 | 255 | 0 |
| 4 | 75 | | 192 | 255 | 0 |
| 5 | 120 | | 0 | 255 | 0 |
| 6 | 180 | | 0 | 255 | 255 |
| 7 | 210 | | 0 | 128 | 255 |
| 8 | 240 | | 0 | 0 | 255 |
| 9 | 270 | | 128 | 0 | 255 |
| 10 | 300 | | 255 | 0 | 255 |
| 11 | 330 | | 255 | 0 | 128 |

FIG. 10

| Channel | Color Parameter | Sample Color | Y Standard Value | Cr Standard Value | Cb Standard Value |
|---|---|---|---|---|---|
| 0 | 0 | | 81.535 | 90.26 | 239.945 |
| 1 | 28 | | 149.215 | 55.34 | 195.785 |
| 2 | 45 | | 189.823 | 34.388 | 169.289 |
| 3 | 60 | | 225.355 | 16.055 | 146.105 |
| 4 | 75 | | 209.164 | 25.379 | 118.448 |
| 5 | 120 | | 159.82 | 53.795 | 34.16 |
| 6 | 180 | | 184.81 | 165.74 | 16.055 |
| 7 | 210 | | 113.182 | 202.697 | 62.791 |
| 8 | 240 | | 40.99 | 239.945 | 109.895 |
| 9 | 270 | | 73.886 | 221.001 | 166.087 |
| 10 | 300 | | 106.525 | 202.205 | 221.84 |
| 11 | 330 | | 94.079 | 146.452 | 230.857 |

FIG. 11

| Channel | Sample Color | R Coefficient | G Coefficient | B Coefficient |
|---|---|---|---|---|
| 0 | | 255 | 0 | 0 |
| 1 | | 255 | 120 | 0 |
| 2 | | 255 | 192 | 0 |
| 3 | | 255 | 255 | 0 |
| 4 | | 192 | 255 | 0 |
| 5 | | 0 | 255 | 0 |
| 6 | | 0 | 255 | 255 |
| 7 | | 0 | 128 | 255 |
| 8 | | 0 | 0 | 255 |
| 9 | | 128 | 0 | 255 |
| 10 | | 255 | 0 | 255 |
| 11 | | 255 | 0 | 128 |

FIG. 12

| Channel | Sample Color | Y Coefficient | Cr Coefficient | Cb Coefficient |
|---|---|---|---|---|
| 0 | | 66,16 | -38,128 | 112,128 |
| 1 | | 133,16 | -73,128 | 68,128 |
| 2 | | 174,16 | -94,128 | 41,128 |
| 3 | | 209,16 | -112,128 | 18,128 |
| 4 | | 193,16 | -103,128 | -10,128 |
| 5 | | 144,16 | -74,128 | -94,128 |
| 6 | | 169,16 | 38,128 | -112,128 |
| 7 | | 97,16 | 75,128 | -65,128 |
| 8 | | 25,16 | 112,128 | -18,128 |
| 9 | | 58,16 | 93,128 | 38,128 |
| 10 | | 91,16 | 74,128 | 94,128 |
| 11 | | 78,16 | 18,128 | 103,128 |

FIG. 13

COLOR GENERATION SYSTEM, METHOD, AND APPARATUS FOR OBJECT TO BE DISPLAYED, DISPLAY DEVICE, AND MEDIUM

CROSS-REFERENCE TO RELATED APPLICATIONS

This is a National Stage Application filed under 35 U.S.C. 371 based on International Patent Application No. PCT/CN2020/101774, filed on Jul. 14, 2020, which claims priority to Chinese Patent Application No. 201911320174.5 filed on Dec. 19, 2019, the disclosures of both of which are incorporated herein by reference in their entireties.

TECHNICAL FIELD

Embodiments of the present application relate to the technical field of measuring instruments, for example, a color generation system, method and apparatus of a to-be-displayed object, a display device and a medium.

BACKGROUND

With the development of technologies, requirements of users for display screens are increasing, the number of channels of a test instrument is also increasing, and the number of types of waveforms keeps growing. However, the configuration of colors of these waveforms has obvious limitations. In the display of a display device, it is now common practice to determine the configuration of colors by means of a correspondence between the brightness and color of a to-be-displayed object that needs to be displayed on the screen and some amount of information of the to-be-displayed object.

For example, in an oscilloscope, the brightness of a to-be-displayed object is related to probability information of hitting pixel points corresponding to the to-be-displayed object, and in a spectrometer, the brightness of a to-be-displayed object of spectral data is related to the amount of signals that appears at the current frequency point within a period of time. In the related art, the display color or brightness of the to-be-displayed object is controlled by a predetermined mapping relationship.

SUMMARY

Embodiments of the present application provide a color generation system, method and apparatus of a to-be-displayed object, a display device and a medium, so as to quickly generate a mapping relationship between the to-be-displayed object and colors, accelerate the mapping between the to-be-displayed object and the colors overall, and reduce the occupied amount of resources and bandwidths.

In a first aspect, an embodiment of the present application provides a color generation system of a to-be-displayed object. The color generation system of a to-be-displayed object includes a to-be-displayed object processing module, a color setting module and a color generation module, where the to-be-displayed object processing module is connected to the color generation module, and the color setting module is connected to the color generation module.

The to-be-displayed object processing module is configured to preprocess a sampled to-be-displayed object, and determine to-be-displayed object information of the sampled to-be-displayed object according to the preprocessed sampled to-be-displayed object.

The color setting module is configured to generate a to-be-displayed object color mapping table based on the to-be-displayed object information, and parse the to-be-displayed object information and color information in the to-be-displayed object color mapping table to obtain a subpixel information component of a display interface.

The color generation module is configured to configure a display color of the sampled to-be-displayed object on the display interface according to the subpixel information component of the display interface.

In a second aspect, an embodiment of the present application further provides a color generation method of a to-be-displayed object. The method includes steps described below.

To-be-displayed object information of a sampled to-be-displayed object is determined.

A to-be-displayed object color mapping table is generated based on the to-be-displayed object information.

Color information of the to-be-displayed object information is configured based on the to-be-displayed object color mapping table.

The to-be-displayed object information and the color information are parsed to obtain a subpixel information component of a display interface.

A display color of the sampled to-be-displayed object is configured on the display interface according to the subpixel information component of the display interface.

In a third aspect, an embodiment of the present application further provides a color generation apparatus of a to-be-displayed object. The apparatus includes an information determination module, a to-be-displayed object color mapping table generation module, a color information configuration module, a subpixel information component determination module and a color display module.

The information determination module is configured to determine to-be-displayed object information of a sampled to-be-displayed object.

The to-be-displayed object color mapping table generation module is configured to generate a to-be-displayed object color mapping table based on the to-be-displayed object information.

The color information configuration module is configured to configure color information of the to-be-displayed object information based on the to-be-displayed object color mapping table.

The subpixel information component determination module is configured to parse the to-be-displayed object information and the color information to obtain a subpixel information component of a display interface.

The color display module is configured to configure a display color of the sampled to-be-displayed object on the display interface according to the subpixel information component of the display interface.

In a fourth aspect, an embodiment of the present application further provides a display device. The display device includes: at least one processor and a storage apparatus configured to store multiple programs.

At least one of the multiple programs, when executed by the at least one processor, causes the at least one processor to implement the color generation method of a to-be-displayed object provided in the embodiment of the second aspect of the present application.

In a fifth aspect, an embodiment of the present application further provides a non-transitory computer-readable storage medium. The non-transitory computer-readable storage medium stores a computer program which, when executed by a processor, implements the color generation method of a to-be-displayed object provided in the embodiment of the second aspect of the present application.

BRIEF DESCRIPTION OF DRAWINGS

FIG. 10 is a table showing a function corresponding relationship between RGB subpixel information components and color information of a to-be-displayed object according to an embodiment of the present application;

FIG. 11 is a table showing a function corresponding relationship between LCD subpixel information components and color information of a to-be-displayed object according to an embodiment of the present application;

FIG. 12 is a table showing a corresponding relationship between RGB subpixel information components and coefficients configured for color information of a to-be-displayed object according to an embodiment of the present application; and FIG. 13 is a table showing a corresponding relationship between LCD subpixel information components and coefficients configured for color information of a to-be-displayed object according to an embodiment of the present application.

DETAILED DESCRIPTION

Figure 1:
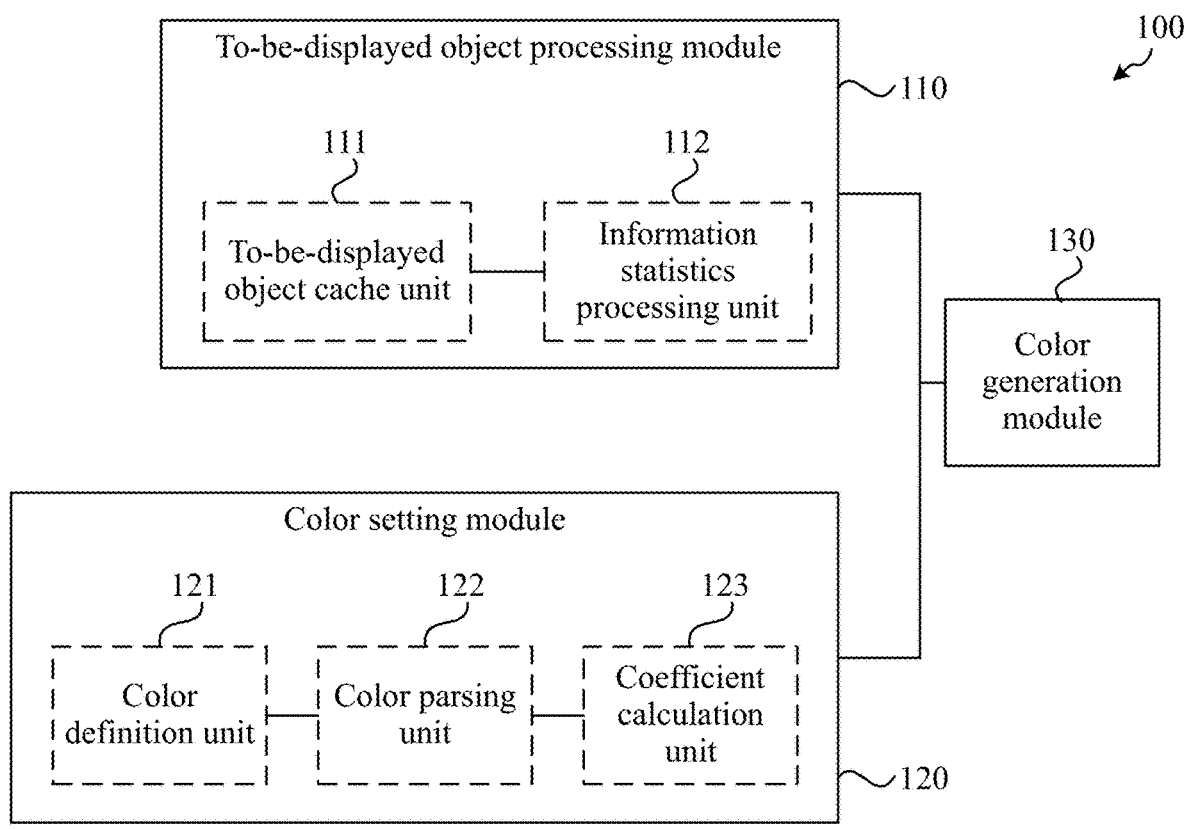
FIG. 1 is a structural diagram of a color generation system of a to-be-displayed object according to an embodiment of the present application.

It is to be noted that for ease of description, only part, not all, of the content related to the present application is illustrated in the drawings. Before exemplary embodiments are discussed in more detail, it is to be noted that some of the exemplary embodiments are described as processing or methods depicted in flowcharts. Although the flowcharts describe operations (steps) as sequential processing, many of the operations may be performed in parallel, coincidently or simultaneously. Additionally, the sequence of the operations may be rearranged. The processing may be terminated when the operations are completed, but the processing may further have additional steps which are not included in the drawings. The processing may correspond to a method, a function, a procedure, a subroutine, a subprogram, etc.

FIG. 1 is a structural diagram of a color generation system of a to-be-displayed object according to an embodiment of the present application. Referring to FIG. 1, the color generation system of a to-be-displayed object 100 includes a to-be-displayed object processing module 110, a color setting module 120 and a color generation module 130, where the to-be-displayed object processing module 110 is connected to the color generation module 130, and the color setting module 120 is connected to the color generation module 130.

The to-be-displayed object processing module 110 is configured to preprocess a sampled to-be-displayed object, and determine to-be-displayed object information of the sampled to-be-displayed object according to the preprocessed sampled to-be-displayed object.

The color setting module 120 is configured to generate a to-be-displayed object color mapping table based on the to-be-displayed object information, and parse the to-be-displayed object information and color information in the to-be-displayed object color mapping table to obtain a subpixel information component of a display interface.

The color generation module 130 is configured to configure a display color of the sampled to-be-displayed object on the display interface according to the subpixel information component of the display interface.

The to-be-displayed object may be a waveform or a measurement trace output from the display device. The display device refers to a device having a display screen, and such a device includes a display device in the conventional sense such as a personal computer, and also includes a measuring device having a display screen, where such a measuring device refers to an instrument that converts measurement results into indication values that can be directly observed, including various types of indicating instruments, recording instruments, or analytical instruments, such as spectrum analyzers or oscilloscopes. Exemplarily, the to-be-displayed object may be a waveform output by an oscilloscope, or may be a measurement trace of a signal in a spectrum analyzer. In this embodiment, the measurement trace may be a density trace measurement in a frequency domain bitmap on a current test interface.

The to-be-displayed object information refers to specific information corresponding to the to-be-displayed object, such as probability information and level information of the waveform of the oscilloscope, a power spectral density identification of the signal in the spectrometer, and so on.

The to-be-displayed object color mapping table is a mapping table reflecting a mapping relationship between the to-be-displayed object information and a display color of the to-be-displayed object. It may be understood that the to-be-displayed object color mapping table is to match the to-be-displayed object information with the color information in real time, and the to-be-displayed object color mapping table may also have various forms as long as the to-be-displayed object color mapping table can be represented visually.

The subpixel information component of the display interface involves a method of dividing the color information of pixel points of the display interface into multiple pieces of subpixel information according to the color space of the display interface of the screen of the display device, fitting corresponding color function curves through an approximation method so as to respectively calculate the corresponding subpixel information, and then combining the subpixel information to constitute the color information for completing the pixel points. In this way, processing is performed in parallel, the overall mapping speed is improved, and the occupied amount of resources and bandwidths is reduced.

Referring to FIG. 1, the to-be-displayed object processing module 110 includes a to-be-displayed object cache unit 111 and an information statistics processing unit 112.

The to-be-displayed object cache unit 111 is configured to preprocess the sampled to-be-displayed object, where the preprocessing includes point tracing or vector rendering.

The information statistics processing unit 112 is configured to determine the to-be-displayed object information of the sampled to-be-displayed object according to the preprocessed sampled to-be-displayed object.

Exemplarily, the to-be-displayed object cache unit 111 preprocesses the sampled to-be-displayed object. Exemplarily, the preprocessing may include, but is not limited to, operations such as point tracing or vector rendering on the to-be-displayed object.

The information statistics processing unit 112 superimposes multiple pieces of to-be-displayed object information to form continuous data information with statistical significance, and processes the statistical continuous data information, so as to determine the required to-be-displayed object information of the sampled to-be-displayed object. Exemplarily, waveform probability information of multiple waveforms is superimposed and waveform probability information obtained by statistics is sorted out to determine the final desired waveform probability information. When the measuring device performs high-speed acquisition, the waveform picture displayed on the screen in fact is formed by superimposing multiple waveforms on each other, and the superimposed parts with high occurrence probability are displayed relatively bright while the superimposed parts with low occurrence probability are displayed relatively dark. Thus, waveform information with bright-dark contrast is formed on the screen, that is, the waveform probability information.

It is to be noted that to satisfy the requirements of the hardware (such as a display screen or a video card) of the display device, multiple processing, such as the data bit width and the normalization, even needs to be performed in this unit, so as to facilitate the mapping and calculation from the to-be-displayed object information to the color information.

Referring to FIG. 1, the color setting module 120 includes a color definition unit 121, a color parsing unit 122 and a coefficient calculation unit 123.

The color definition unit 121 is configured to determine a to-be-displayed object color mapping function block based on the to-be-displayed object information, and generate the to-be-displayed object color mapping table.

The color parsing unit 122 is configured to parse the to-be-displayed object information and the color information in the to-be-displayed object color mapping table to obtain subpixel information corresponding to pixel information of the display interface.

The coefficient calculation unit 123 is configured to determine the subpixel information component of the display interface according to the subpixel information.

The to-be-displayed object color mapping function block refers to a mapping function block of "to-be-displayed object information and color" which is provided for a user by the display device. Taking the waveform information of the oscilloscope as an example, if the waveform information of the oscilloscope is selected as the waveform probability information by the user, a "probability-color" mapping function block may be selected on the oscilloscope; if the waveform information of the oscilloscope is selected as the waveform level amplitude information by the user, a "level amplitude—color" mapping function block may be selected on the oscilloscope, etc.

Exemplarily, the color definition unit 121 displays a preset to-be-displayed object color mapping function block on the display interface of the screen of the display device, configures color information of a to-be-displayed object interface based on the preset to-be-displayed object color mapping function block, then displays the mapping relationship between the color information and the to-be-displayed object information of the to-be-displayed object configured on the current display interface in the to-be-displayed object color mapping function block, and at the same time, generates the to-be-displayed object color mapping table reflecting the one-to-one corresponding mapping relationship between the color information and the to-be-displayed object information of the to-be-displayed object, so as to complete the setting.

The color parsing unit 122 parses the to-be-displayed object color mapping table based on the color space of the display interface of the screen of the display device, and generates the subpixel information which corresponds to the pixel information of the display interface and can be subjected to mathematical operations. Exemplarily, based on methods like Red, Green, and Blue (RGB) or Hue, Lightness, and Saturation (HLS) in the related art, the color information in the to-be-displayed object color mapping table is converted into data information to facilitate subsequent operations.

The coefficient calculation unit 123 matches the parsed subpixel information with the subpixel information content of each pixel point of the color information of the display interface and fits corresponding function curves, so as to facilitate subsequent quick operations, where each subpixel of a pixel point respectively corresponds to a function curve. For a relatively complex color information combination, function curves are too complex, so that mapping matching may be performed to obtain a mapping relationship between the color information of the display interface and the subpixel information content of each pixel point.

Referring to FIG. 1, the coefficient calculation unit 123 is further configured to determine a coefficient of the subpixel information component according to a channel index of the display interface.

Exemplarily, based on fitted function coefficient sets of the color information and the subpixel information content of the pixel point, a function coefficient set needing to be called is determined according to a channel index number. For example, the function coefficient set includes coefficients of three subpixel information components of X, Y, and Z, respectively. Function relationship sets are derived from the multiple fitted function curves corresponding to subpixels.

Referring to FIG. 1, the color generation module 130 is further configured to configure the display color of the sampled to-be-displayed object on the display interface according to the subpixel information component of the display interface and the coefficient of the subpixel information component.

It may be understood that for the relatively regular color information, the coefficient of the subpixel information component is configured through the function curve operation, and for the complex color information, the coefficient of the subpixel information component is configured by mapping, and then the display color of the sampled to-be-displayed object is configured on the display interface.

According to the technical solution of the embodiment of the present application, the color generation system of a to-be-displayed object includes a to-be-displayed object processing module, a color setting module and a color generation module, where the to-be-displayed object processing module is connected to the color generation module, and the color setting module is connected to the color generation module. The to-be-displayed object processing module is configured to preprocess a sampled to-be-displayed object, and determine to-be-displayed object information of the sampled to-be-displayed object according to the preprocessed sampled to-be-displayed object. The color setting module is configured to generate a to-be-displayed object color mapping table based on the to-be-displayed object information, and parse the to-be-displayed object information and color information in the to-be-displayed object color mapping table to obtain a subpixel information component of a display interface. The color generation module is configured to configure a display color of the sampled to-be-displayed object on the display interface according to the subpixel information component of the display interface. According to the technical solution, the situation is avoided that the color display configuration of the to-be-displayed object in the related art is limited and is not flexible and free enough, the mapping relationship between the to-be-displayed object and colors is quickly generated, the mapping between the to-be-displayed object and the colors is accelerated overall, and the occupied amount of resources and bandwidths is reduced.

Figure 2:
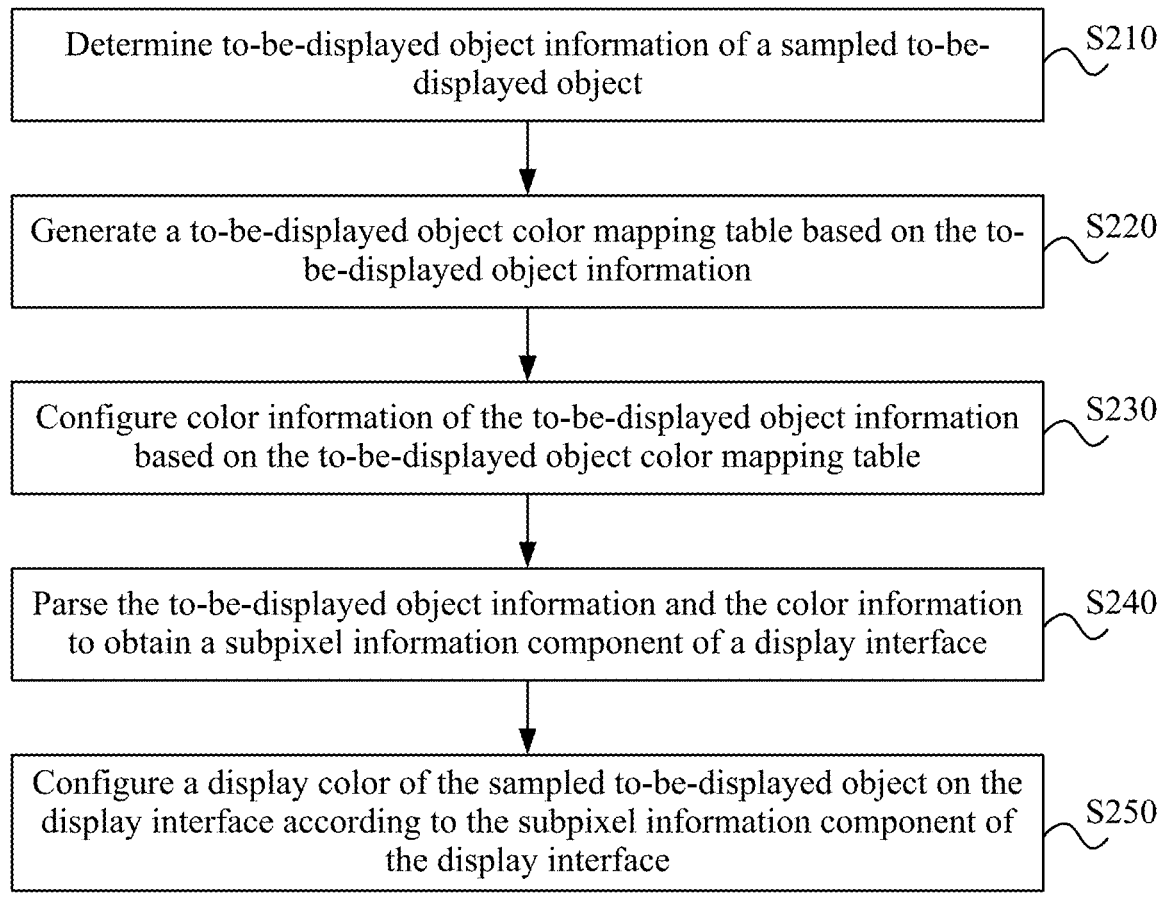
FIG. 2 is a flowchart of a color generation method of a to-be-displayed object according to an embodiment of the present application.

FIG. 2 is a flowchart of a color generation method of a to-be-displayed object according to an embodiment of the present application. The embodiment is applicable to the case where the to-be-displayed object of the display device and the color information displayed by the to-be-displayed object may be freely set. The method may be executed by a color generation apparatus of a to-be-displayed object, and the apparatus may be implemented in the form of software and/or hardware. The method includes steps S210 to S250.

In S210, to-be-displayed object information of a sampled to-be-displayed object is determined.

In S220, a to-be-displayed object color mapping table is generated based on the to-be-displayed object information.

It may be understood that after the to-be-displayed object information is determined, a to-be-used to-be-displayed object interface may be generated for displaying the to-be-displayed information of the to-be-displayed object in the to-be-displayed object interface.

Exemplarily, waveform probability information of an oscilloscope is taken as an example. Waveform characteristic information of a to-be-displayed waveform is acquired, and a corresponding waveform display interface is generated according to the waveform characteristic information.

The to-be-displayed object interface refers to an interface provided for the user on the display interface of the display device, where such an interface contains color combinations related to display parameters of the screen of the display device and contains all colors and brightness ranges capable of being displayed by the screen of the display device. The to-be-displayed object interface is used for the to-be-displayed object to display when the to-be-displayed object is output. The to-be-displayed object interface is disposed on the display screen of the display device and is in an independent display layer.

In S230, color information of the to-be-displayed object information is configured based on the to-be-displayed object color mapping table.

The color information may include a variety of colors in the related art, that is, may include a sufficient number of colors. Meanwhile, the color information also needs to be adapted to hardware conditions of the display of the display device. Exemplarily, for the screen of a display device that supports 256 color scales, the color information is generally 8-bit monochrome information, thus RGB has 24-bit color information, and up to $2^8*2^8*2^8=16777216$ colors may be distributed on the screen of the display device.

The color information may be selected in many different ways, for example, by using a color wheel, a color disc, a color ring, a color rectangle fame and the like. Exemplarily, a color disc is taken as an example. The color disc is a color circle where colors are arranged in order at 360 degrees according to the hue, and colors having different brightness in the same hue are generally increased from the center point to the circumference to form a regular color circle.

It is to be understood that the presentation form of the color information may also be other shapes, and this embodiment of the present application is only used for explanation and not construed as limitation thereto. The selection of different presentation forms of the color information is to facilitate selecting the color that meets the hardware display screen to complete the subsequent mapping.

Exemplarily, after the color information of the to-be-displayed object is determined, the color information of the to-be-displayed object information is determined based on the to-be-displayed object color mapping table, that is, the color information of the to-be-displayed object information here is determined according to the color and brightness range that can be displayed by the screen of the display device.

In S240, the to-be-displayed object information and the color information are parsed to obtain a subpixel information component of a display interface.

Exemplarily, after the color information of the to-be-displayed object information is configured based on the to-be-displayed object color mapping table, that is, the color information of the to-be-displayed object is denoted as a numerical value, the subpixel information component of the to-be-displayed object on the display interface is determined according to pixel information of the display interface of the screen of the display device.

It may be understood that the manner for representing the color information of the to-be-displayed object as the numerical value may be the common RGB representation and HLS representation, or may be defined by software developers as needed to facilitate the subsequent color configuration.

In S250, a display color of the sampled to-be-displayed object is configured on the display interface according to the subpixel information component of the display interface.

Exemplarily, based on the subpixel information component of the display interface, a coefficient of the subpixel information component is determined according to a channel index of the display interface, and the display color of the sampled to-be-displayed object is configured on the display interface according to the subpixel information component of the display interface and the coefficient of the subpixel information component.

According to the technical solution of the embodiment of the present application, to-be-displayed object information of a sampled to-be-displayed object is determined, a to-be-displayed object color mapping table is generated based on the to-be-displayed object information, color information of the to-be-displayed object information is configured based on the to-be-displayed object color mapping table, the to-be-displayed object information and the color information are parsed to obtain a subpixel information component of a display interface, and a display color of the sampled to-be-displayed object is configured on the display interface according to the subpixel information component of the display interface. According to the technical solution, the situation is avoided that the color display configuration of the to-be-displayed object in the related art is limited and is not flexible and free enough, the mapping relationship between the to-be-displayed object and colors is quickly generated, the mapping between the to-be-displayed object and the colors is accelerated overall, and the occupied amount of resources and bandwidths is reduced.

Figure 3A:
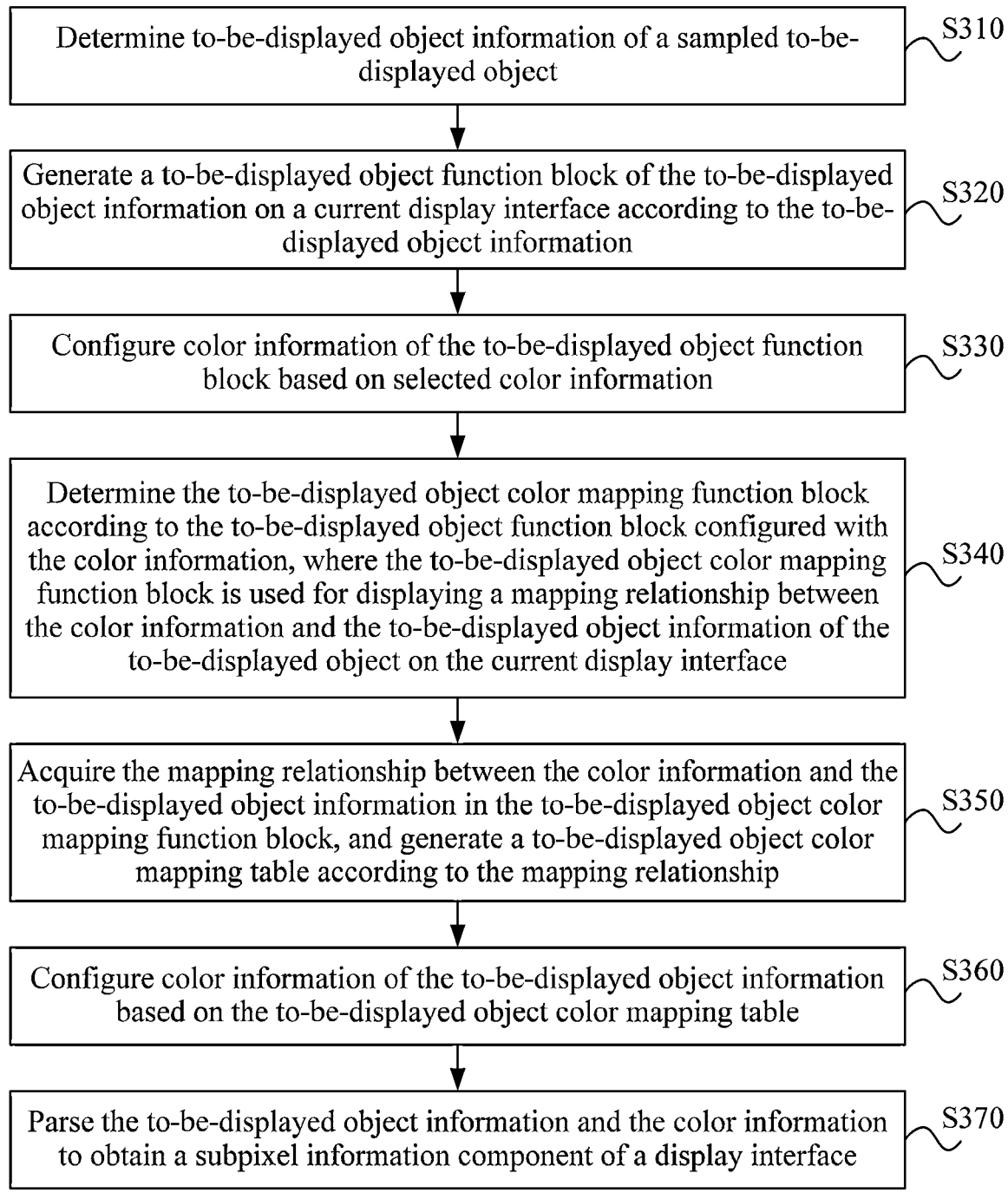
FIG. 3A is a flowchart of another color generation method of a to-be-displayed object according to an embodiment of the present application.

FIG. 3A is a flowchart of another color generation method of a to-be-displayed object according to an embodiment of the present application. This embodiment makes optimization based on the preceding embodiments.

The method of this embodiment includes steps S310 to S370.

In S310, to-be-displayed object information of a sampled to-be-displayed object is determined.

In S320, a to-be-displayed object function block of the to-be-displayed object information is generated on a current display interface according to the to-be-displayed object information.

Exemplarily, the to-be-displayed object function block is generated on a to-be-displayed object interface, a mapping relationship between color information and the to-be-displayed object information of the to-be-displayed object is configured on the current display interface, and a preset to-be-displayed object color mapping function block corresponding to the to-be-displayed object information is generated based on the to-be-displayed object information.

Figure 3B:
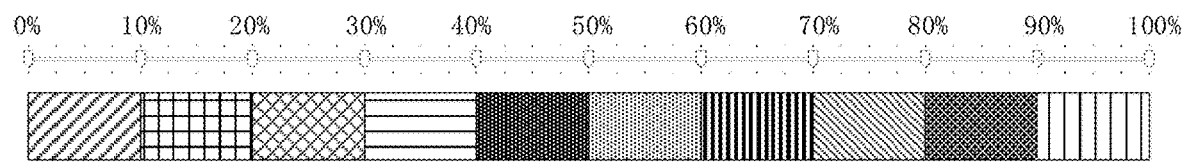
FIG. 3B is a schematic view of an exemplary mapping block of waveform probability information and color information according to an embodiment of the present application.
Figure 3C:
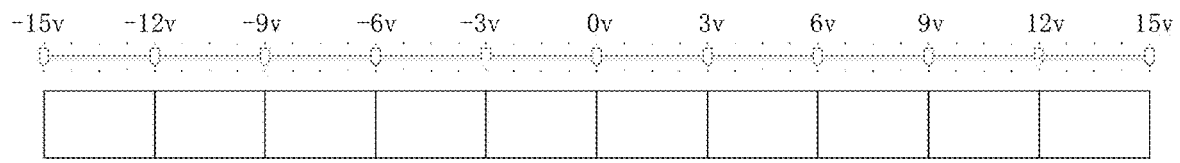
FIG. 3C is a schematic view of an exemplary mapping block of level amplitude information and color information of an oscilloscope according to an embodiment of the present application.

Exemplarily, FIG. 3B is a schematic view of an exemplary mapping block of waveform probability information and color information according to an embodiment of the present application. Referring to FIG. 3B, a mapping block of waveform probability information and color information of the oscilloscope is taken as an example. The waveform probability information and colors are uniformly distributed, that is, one interval of the waveform probability information corresponds to one color, and different intervals of the waveform probability information correspond to different colors. FIG. 3C is a schematic view of an exemplary mapping block of level amplitude information and color information of an oscilloscope according to an embodiment of the present application, that is, one interval of the level amplitude corresponds to one color, and different intervals of the level amplitude correspond to different colors.

It is to be noted that the to-be-displayed object color mapping function block may be in the form of tables, images, diagrams and the like capable of expressing the mapping relationship between colors and certain to-be-presented parameters.

Figure 3D:
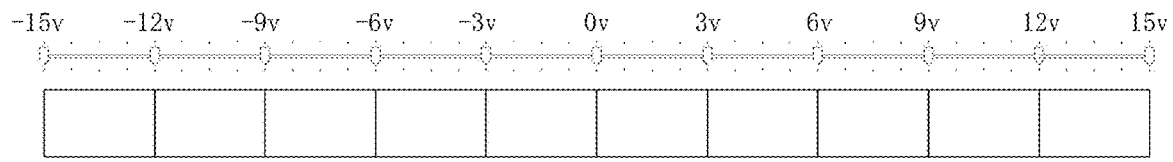
FIG. 3D is a schematic view of an exemplary to-be-displayed object color mapping function block according to an embodiment of the present application.

FIG. 3D is a schematic view of an exemplary to-be-displayed object color mapping function block according to an embodiment of the present application. Referring to FIG. 3D, the to-be-displayed object color mapping function block may be uniformly distributed or non-uniformly distributed.

In this embodiment, the level amplitude information of the oscilloscope is displayed as color A in the amplitude from −15v to −9v and color B in the amplitude from −9v to +6v, and in a case where the amplitude is greater than 6v, the waveforms are displayed as color C. That is, the same waveform may be displayed in three different colors, and thus the amplitude information of a waveform at a certain moment can be visually seen.

Additionally, it is to be noted that the to-be-displayed object color mapping function block having selected colors is distributed uniformly and proportionally by default. For example, when four different colors are selected, the entire to-be-displayed object color mapping function block is formed according to the proportion distribution of each color occupying 25%. Additionally, the to-be-displayed object color mapping function block may also support the non-uniform distribution, and such a non-uniform adjustment may have two options, that is, an intelligent recommended adjustment and a manual non-uniform adjustment.

Exemplarily, after the color information is configured in the to-be-displayed object color mapping function block, the to-be-displayed object color mapping function block is correspondingly displayed on the to-be-displayed object interface. Meanwhile, the to-be-displayed object displays the to-be-displayed object information on the to-be-displayed object interface based on the mapping relationship, in the to-be-displayed object color mapping function block, between the to-be-displayed object information and colors.

In S330, color information of the to-be-displayed object function block is configured based on selected color information.

In S340, the to-be-displayed object color mapping function block is determined according to the to-be-displayed object function block configured with the color information, where the to-be-displayed object color mapping function block is used for displaying a mapping relationship between the color information and the to-be-displayed object information of the to-be-displayed object on the current display interface.

In S350, the mapping relationship between the color information and the to-be-displayed object information in the to-be-displayed object color mapping function block is acquired, and a to-be-displayed object color mapping table is generated according to the mapping relationship.

Exemplarily, after the mapping relationship between the color information and the to-be-displayed object information in the to-be-displayed object color mapping function block is determined, the color information is denoted as a numerical value, and the mapping relationship table corresponding to the color information and the to-be-displayed object information is generated and stored to facilitate the subsequent color configuration. The manner for expressing the color information as the numerical value may be the common RGB representation and HLS representation, which is not limited in this embodiment.

In S360, color information of the to-be-displayed object information is configured based on the to-be-displayed object color mapping table.

In S370, the to-be-displayed object information and the color information are parsed to obtain a subpixel information component of a display interface.

Exemplarily, the RGB 24 color space format supported by the display driver of the screen of the display device is taken as an example. When the to-be-displayed object information and the color information are parsed, the RGB may be directly used for parsing the color information configured by a user into the RGB format. Exemplarily, when the user selects to set all the 12 channels of the display device to be that the color information is related to the waveform probability information, and the waveform probability information has the brightness of 256 scales, each channel is set with a different color as shown in the table of FIG. 10, which shows a function corresponding relationship between RGB subpixel information components and the color information of the to-be-displayed object.

Exemplarily, an LCD screen is taken as an example, and the corresponding input displayed on the LCD screen is a YCbCr value. Referring to FIG. 11, the table shows a function corresponding relationship between LCD subpixel information components and the color information of the to-be-displayed object. The measuring instrument obtains the function corresponding relationship between RGB subpixel information components and the color information of the to-be-displayed object according to an input channel index, colors and brightness knob values, and then may directly perform conversion from RGB values in the preceding table of FIG. 10 according to a conversion relationship between YCbCr values and the RGB values (as shown below).

$$\begin{bmatrix} Y \\ Cb \\ Cr \end{bmatrix} = \begin{bmatrix} 16 \\ 128 \\ 128 \end{bmatrix} + (1/256) \begin{bmatrix} 65.738 & 129.057 & 25.06 \\ -37.945 & -74.494 & 112.43 \\ 112.439 & -94.154 & -18.28 \end{bmatrix} \begin{bmatrix} R \\ G \\ B \end{bmatrix}.$$

That is, $Y=0.257*R+0.564*G+0.098*B+16$,
$Cb=-0.148*R-0.291*G+0.439*B+128$, and
$Cr=0.439*R-0.368*G-0.071*B+128$.

In S380, a display color of the sampled to-be-displayed object is configured on the display interface according to the subpixel information component of the display interface.

Exemplarily, the RGB 24 color space format supported by the display driver of the screen of the display device is taken as an example. When a user selects to set all the 12 channels of the display device to be that the color information is related to the waveform probability information, a function relationship of each subpixel information channel of the display device is obtained in a case where the waveform probability information is brightened in equal proportion. For the RGB color space, each piece of subpixel information is an R color component, a G color component and a B color component, respectively. It is assumed that the probability of a waveform is P, and the waveform is completely proportionally mapped, the coefficient required to be configured for each subpixel information component is shown in the table of FIG. 12, which shows a corresponding relationship between RGB subpixel information components and coefficients configured for the color information of the to-be-displayed object.

It can be seen that the coefficient of each subpixel information component is a vector value, and respectively corresponds to the RGB value. The vector value has only a first power coefficient shown in the table of FIG. 12.

Exemplarily, an LCD screen is taken as an example, and each piece of subpixel information is a Y color component, a Cr color component and a Cb color component, respectively. It is assumed that the probability of a waveform is P, and the waveform is completely proportionally mapped, the coefficient required to be configured for each subpixel information component is shown in the table of FIG. 13, which shows a corresponding relationship between LCD subpixel information components and coefficients configured for the color information of the to-be-displayed object.

The coefficients are slightly more complex for the YCrCb color space who corresponds to a function with both a first power coefficient and a constant term.

Exemplarily, when it is determined that the waveform of channel 2 is shown, a coefficient calculation unit is read according to the index of channel 2 to obtain the coefficient sets as [174, 16], [−94, 128] and [41, 128]

Then, the Y component satisfies that $Y=174*P+16$,
the Cr component satisfies that $Cr=-94*P+128$, and
the Cb component satisfies that $Cb=41*P+128$.

Then, different subpixel information parameters can be obtained, and after the calculation is respectively completed, complete pixel information is synthesized, and thus the color of the to-be-displayed object can be completely displayed.

Based on the preceding embodiments, another embodiment is provided to achieve multicolor display on a single channel. The color temperature display in a specific application scene is taken as an example. The color temperature display uses the cold and warm color temperature of the to-be-displayed object to reflect the distribution of the to-be-displayed object information. The mapping block of the waveform probability information and the color information of the oscilloscope is taken as an example. The waveform with a low frequency of occurrence is displayed in cold color, and the waveform with a high frequency of occurrence is displayed in warm color, that is, the probability increases from blue to red in order. In the RGB color space, the function fitting of the subpixel information is performed on the waveform probability information and the color information.

Figure 3E:
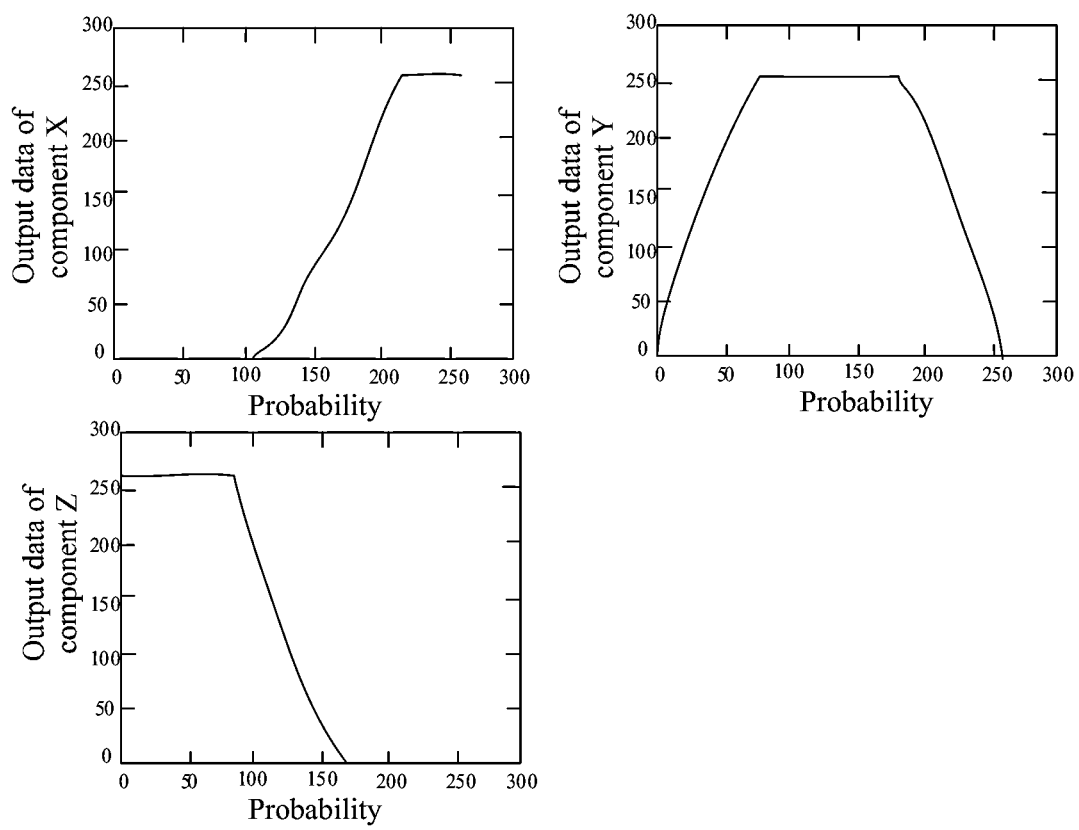
FIG. 3E is a schematic diagram showing exemplary results of subpixel information components and probabilities according to an embodiment of the present application.

FIG. 3E is a schematic diagram showing exemplary results of subpixel information components and probabilities according to an embodiment of the present application. The function fitting may be performed by using the most common algorithm. After multiple components of the color information are fitted by point approximation, curves of three subpixel functions are obtained as shown in FIG. 3E.

After the fitting is completed, the three subpixel functions can be obtained as follows, where P is the probability value of the waveform:

$$\begin{cases} R = 0.0007324 * P^2 + 0 * P - 80 \\ G = -0.01831 * P^2 + 4.6875 * P + 0 \\ B = 0.0122 * P^2 - 6.25 * P + 700 \end{cases}$$

Therefore, three coefficient vectors respectively satisfy that:

$h_R$=[0.0007324, 0, −80],
$h_G$=[−0.01831, 4.6875, 0], and
$h_B$=[0.0122, −6.25, 700].

That is, for the relatively complex color combination information, the coefficient calculation operation may be completed by a multiply-accumulate operation using a second power function.

The technical solution of the embodiments of the present application provides rich color configuration, and thus the most comprehensive color configuration can be completed if the hardware (such as a display screen and a video card) of the instrument allows. For whether the RGB color space, the HLS color space and the HVB color space, or the YCrCb color space and the Cyan, Magenta, Yellow, and Key (CMYK) color space, the configuration can be completed and the operation can be simplified through the calculation of subpixel information components, and the transplanting and upgrading can be performed conveniently.

Figure 4A:
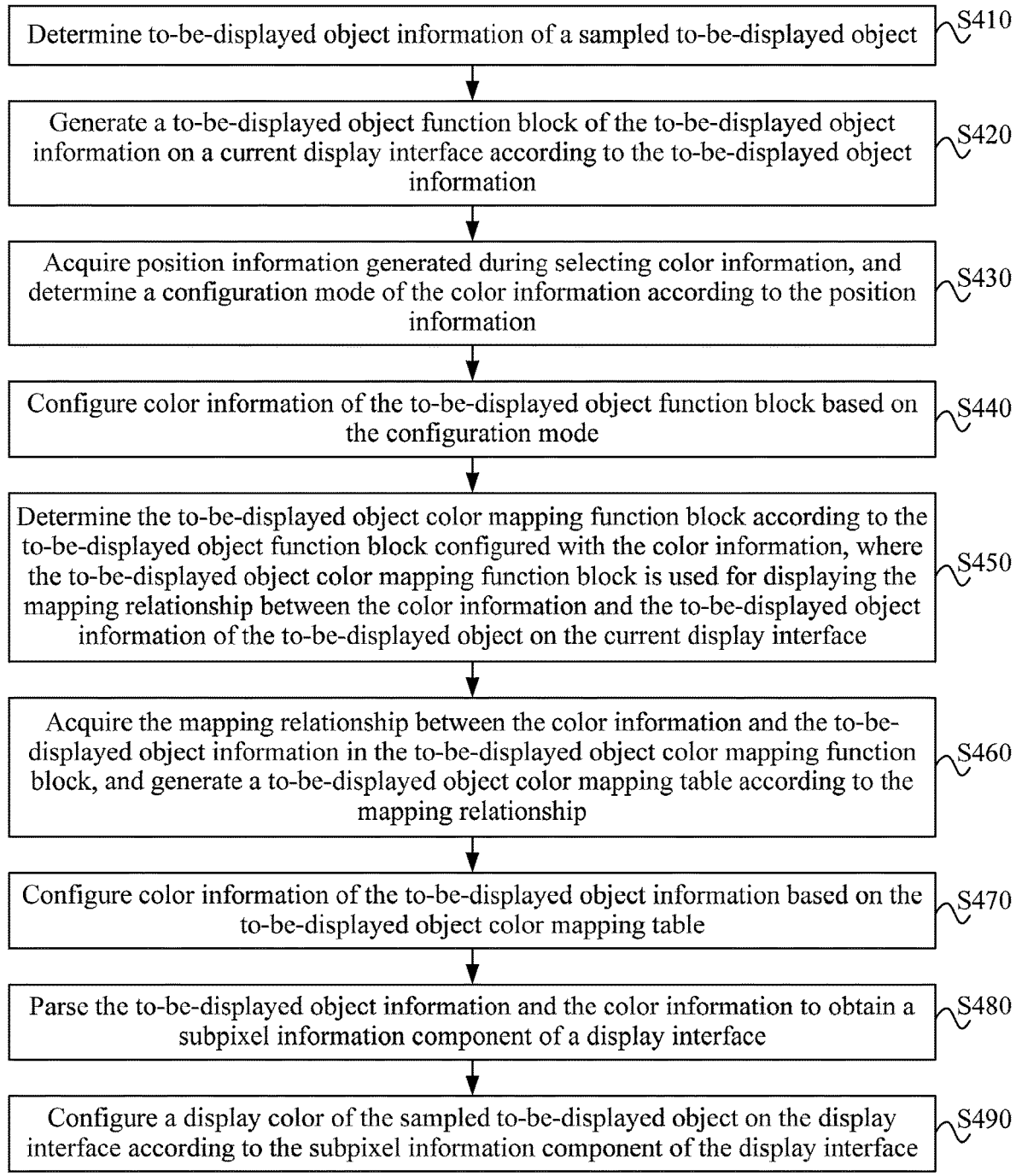
FIG. 4A is a flowchart of another color generation method of a to-be-displayed object according to an embodiment of the present application.

FIG. 4A is a flowchart of another color control method of a to-be-displayed object according to an embodiment of the present application. This embodiment makes optimization based on the preceding embodiments.

The method of this embodiment includes steps S410 to S490.

In S410, to-be-displayed object information of a sampled to-be-displayed object is determined. In S420, a to-be-displayed object function block of the to-be-displayed object information is generated on a current display interface according to the to-be-displayed object information.

In S430, position information generated during selecting color information is acquired, and a configuration mode of the color information is determined according to the position information.

Before the configuration mode of the color information is determined according to the position information, an offset threshold of the configuration mode is determined according to a selection interface of the color information and a color scale of the color information in the selection interface.

The selection interface of the color information is the presentation form for selecting the color, for example, by using a color wheel, a color disc, a color ring, a color rectangle fame and the like.

The color scale is an index standard indicating the intensity of the image brightness. In this embodiment, the color scale of the color information in the selection interface is adapted to the hardware conditions of the display of the display device, that is, the configuration mode may be related to the brightness range that can be displayed by the screen of the display device.

Exemplarily, the selection interface of the color information being a color disc is taken as an example. The radius of the color disc occupying the screen of the display device is represented as L, the color scale of the color disc is represented as S, and the offset threshold of the configuration mode may be calculated by the formula described below.

The formula satisfies that:

the offset threshold=$L/2^S*2$.

The step in which the position information generated during selecting the color information is acquired and the configuration mode of the color information is determined according to the position information includes steps described below. The position information generated during selecting the color information is acquired, and a position offset generated during selecting the color information is determined according to the position information. The configuration mode of the color information is determined according to the position offset and the offset threshold.

For the display device, the color information may be selected by touching the screen of the display device with a user gesture or by using the mouse, or may be selected by performing other similar operations of selecting and confirming the color information displayed on the screen of the display device, which is not limited in the embodiment of the present application.

The position information generated during selecting the color information refers to the position or displacement of a point or a track generated on the selection interface of the color information when the operation of selecting the color information is performed. Exemplarily, when the color information is selected, the starting point of the selection interface of the color information is set to A, a position offset is generated based on the movement from point A to point B, and the position offset is compared with the offset threshold to determine the configuration mode of the color information.

The step in which the configuration mode of the color information is determined according to the position offset and the offset threshold includes the step described below. Whether the position offset is less than the offset threshold is determined, and in a case where the position offset is less than the offset threshold, the configuration mode is point configuration.

The step in which the configuration mode of the color information is determined according to the position offset and the offset threshold includes the step described below. Whether the position offset is greater than the offset threshold is determined, and in a case where the position offset is greater than the offset threshold, the configuration mode is vector configuration.

Exemplarily, in a case where the position offset is less than the offset threshold, the configuration mode is the point configuration; in a case where the position offset is greater than the offset threshold, the configuration mode is the vector configuration.

Exemplarily, in a case where the position offset is equal to the offset threshold, the configuration mode is the point configuration or the vector configuration, and which configuration mode is specifically used may be selected by those skilled in the art according to actual situations and is not limited in the present application.

Exemplarily, when the color information is selected, the movement of the mouse arrow or the movement of the point selected by the position corresponding to the finger in the user gesture can be perceived on the screen of the display device. In a case where the moved distance (that is, the position offset) is greater than the offset threshold, it is indicated that more than one pieces of color information are needed in one time of color information selection, and the configuration mode of the color information is the vector configuration; and in a case where the moved distance (that is, the position offset) is less than the offset threshold, it is indicated that only one piece of color information is acquired in one time of color information selection, and the configuration mode of the color information is the point configuration.

It is to be noted that in a case where the configuration mode of the color information is the point configuration, it is only required to configure the color information selected in the current selection interface of the color information to a to-be-displayed object color mapping function block, while in a case where the configuration mode of the color information is the vector configuration, it is required to determine all color information contained in the position movement track and configure the all color information as a group of color information to the to-be-displayed color mapping function block.

In S440, color information of the to-be-displayed object function block is configured based on the configuration mode.

In a case where the configuration mode is the point configuration, the step in which the color information of the to-be-displayed object function block is determined based on the configuration mode includes the step described below. Acquired color information that is selected in the configuration mode of the point configuration is configured as color information of a selected position of the to-be-displayed object function block.

Figure 4B:
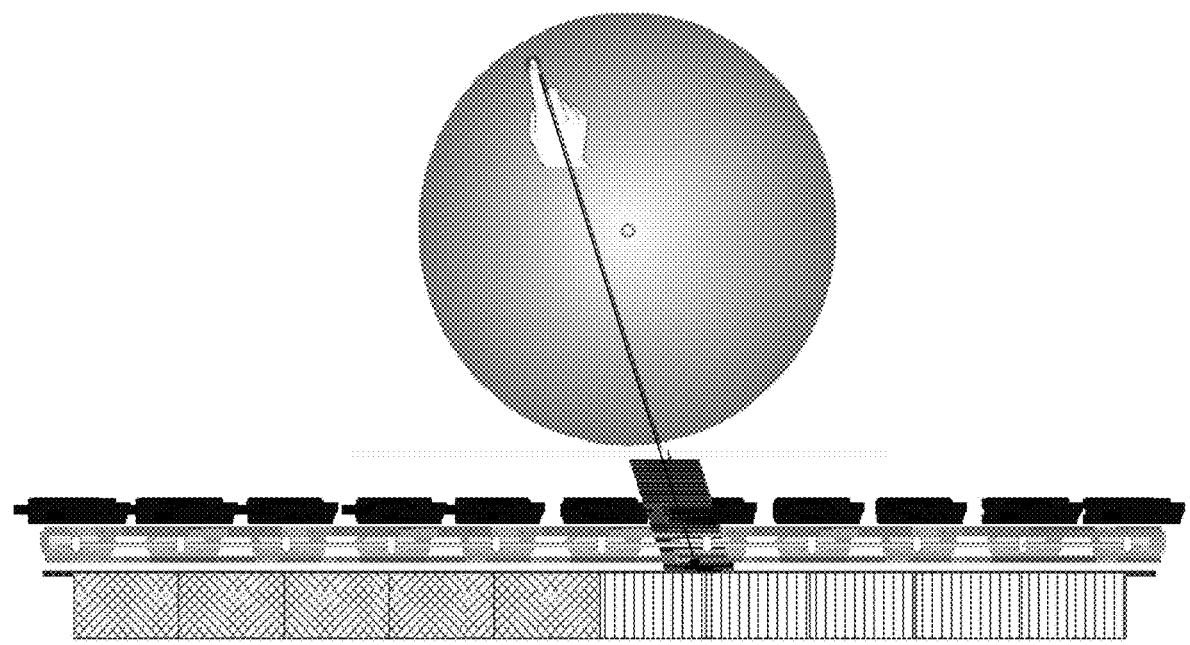
FIG. 4B is a schematic view of determining color information of a selected position of a to-be-displayed object color mapping function block through exemplary point configuration according to an embodiment of the present application.

Exemplarily, the selection interface of the color information being a color disc is taken as an example FIG. 4B is a schematic view of determining color information of a selected position of a to-be-displayed object color mapping function block through exemplary point configuration according to an embodiment of the present application. The color information of the selection position of the color disc is acquired through the user gesture, and the color information is configured to the selected position of the to-be-displayed object color mapping function block. For this process, reference is made to FIG. 4B.

Figure 4C:
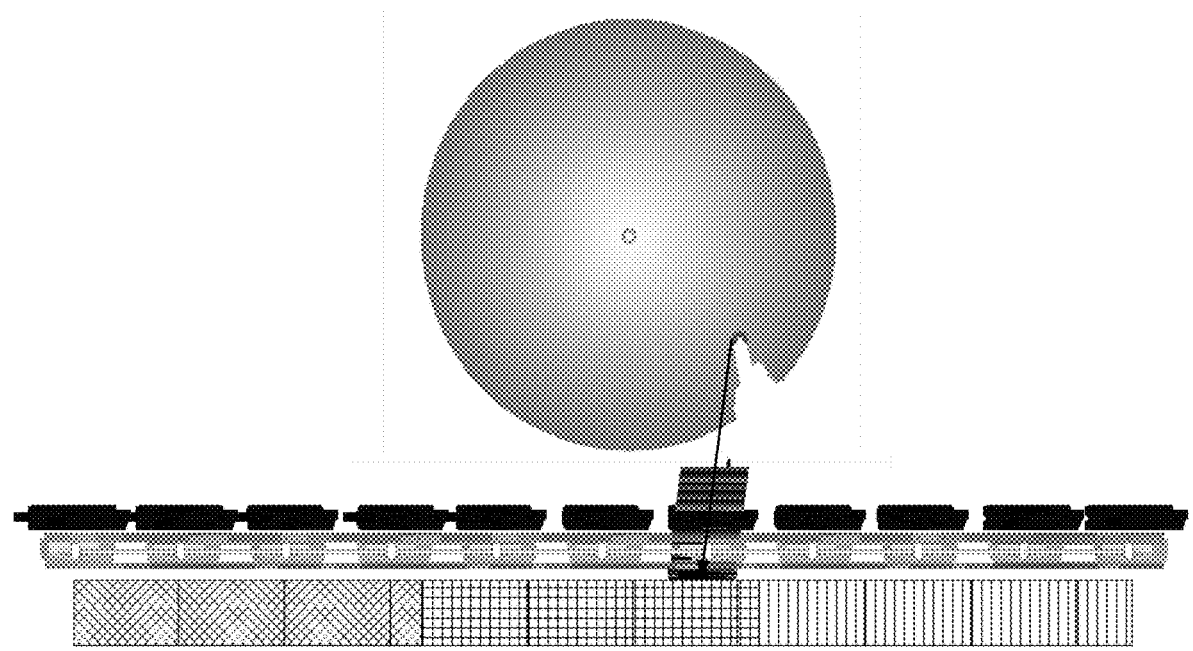
FIG. 4C is a schematic view of adding new color information to an existing to-be-displayed object color mapping function block through exemplary point configuration according to an embodiment of the present application.

FIG. 4C is a schematic view of adding new color information to an existing to-be-displayed object function block through exemplary point configuration according to an embodiment of the present application. It is to be noted that after the point configuration is completed, with reference to the process in FIGS. 4B to 4C, the selected color information may be dragged directly to any position of the to-be-displayed object function block, and in a case where the color information needs to be selected again, new color information needs to be added between the existing color information.

In a case where the configuration mode is the vector configuration, the step in which the color information of the to-be-displayed object function block is determined based on the configuration mode includes the step described below. Selected continuous color information is acquired in the configuration mode of the vector configuration, and the continuous color information is configured as the color information of the to-be-displayed object function block.

Exemplarily, after it is determined that the configuration mode is the vector configuration, the fitting and correction need to be performed on the track generated in the selection interface of the color information due to the continuous movement of the position when the color information is selected and the corresponding color information acquired in the selection interface of the color information on the screen of the display device. The manner for the fitting and correction may be considered in three cases. The manner for the fitting is, after the blurring processing is performed on the track, to determine track information based on the priority principles described below giving priority to some of the most common and practical color mappings.

Figure 4D:
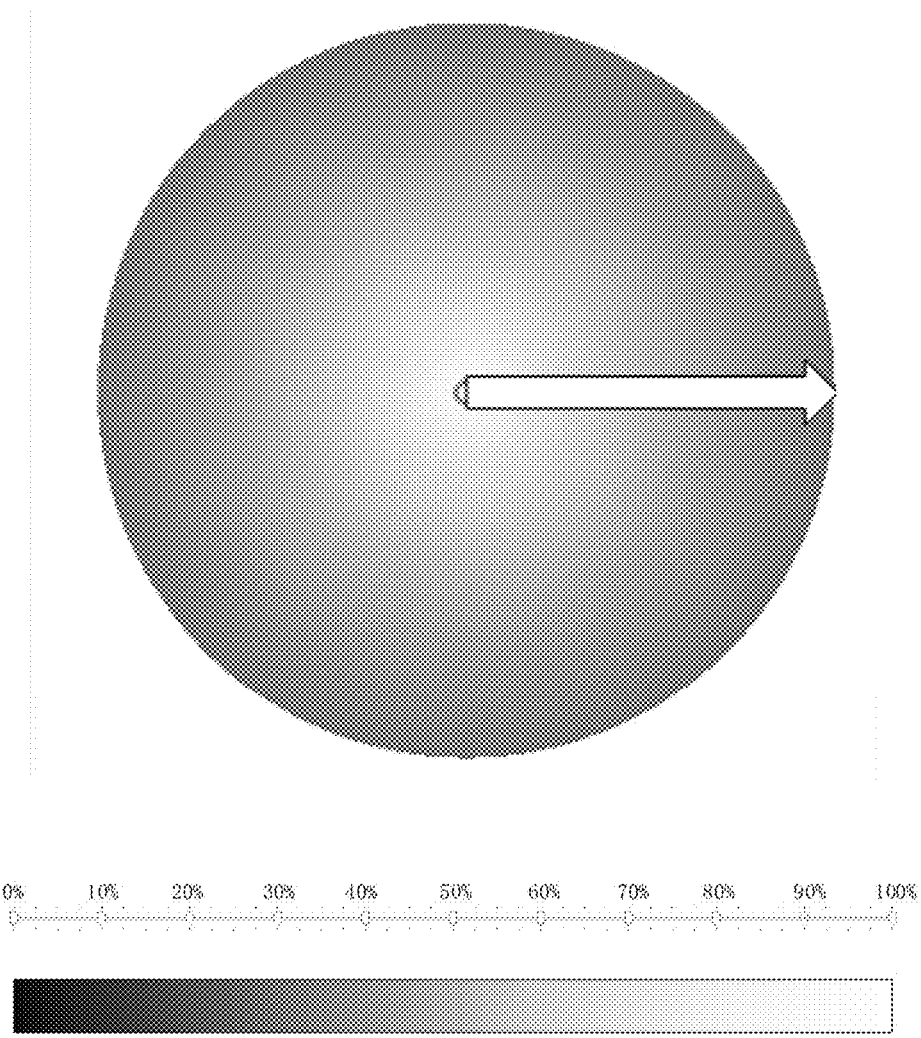
FIG. 4D is a schematic view of determining a first-priority color selection track through vector configuration according to an embodiment of the present application.

FIG. 4D is a schematic view of determining a first-priority color selection track through vector configuration according to an embodiment of the present application. Referring to FIG. 4D, the selection interface of the color information being a color disc is taken as an example. The first priority is a track of colors of different brightness and in the same hue, and this track is represented on the color disc as a track of the radius of the color disc from the center point to the circumference (or from the circumference to the center point). As shown in the to-be-displayed object color mapping function block in FIG. 4D, this segment of colors only with different brightness is added to the to-be-displayed object color mapping function block.

Figure 4E:
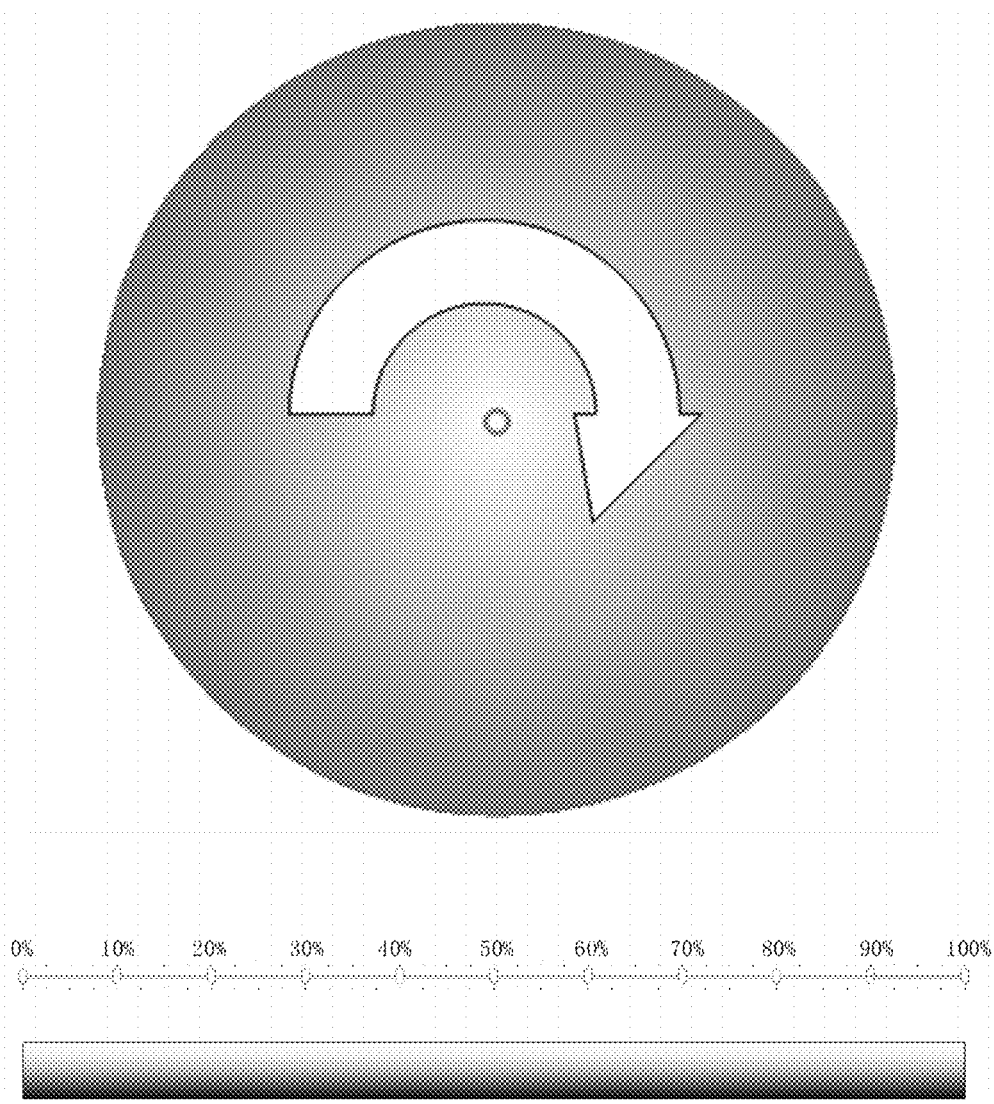
FIG. 4E is a schematic view of determining a second-priority color selection track through vector configuration according to an embodiment of the present application.

FIG. 4E is a schematic view of determining a second-priority color selection track through vector configuration according to an embodiment of the present application. Referring to FIG. 4E, the selection interface of the color information being a color disc is taken as an example. The second priority is a track of different colors and of the same brightness, and this track is represented on the color disc as a ring having an equal radius length. As shown in the to-be-displayed object function block in FIG. 4E, this segment of colors the same only in the brightness and different in their starting positions and ending positions, that is, in colors, is added to the to-be-displayed object function block.

Figure 4F:
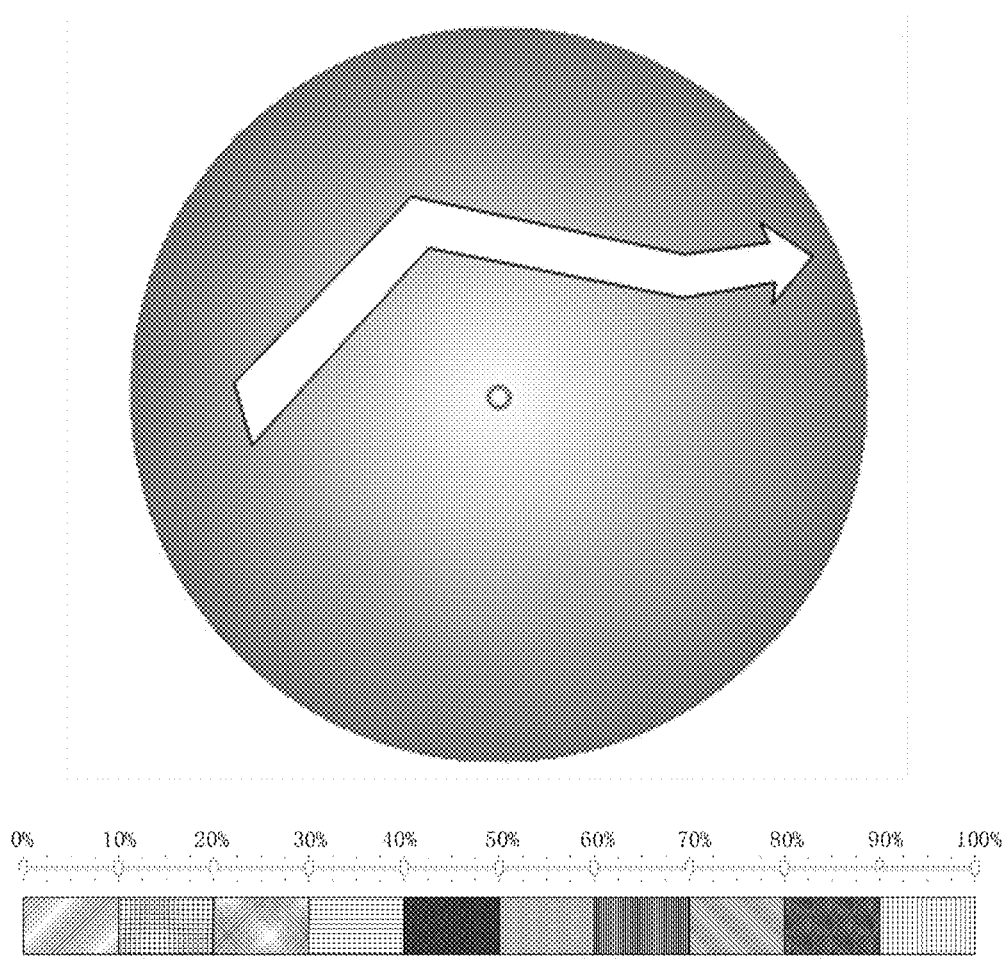
FIG. 4F is a schematic view of determining a lowest-priority color selection track through vector configuration according to an embodiment of the present application.

FIG. 4F is a schematic view of determining a lowest-priority color selection track through vector configuration according to an embodiment of the present application. Referring to FIG. 4F, the selection interface of the color information being a color disc is taken as an example. The lowest priority is a determined track freely distributed on the color disc and not forming the preceding two patterns. In this case, all colors that this track passes through need to be confirmed, the color information of these colors is stored, and a color band is formed and then configured to the to-be-displayed object function block. As shown in the to-be-displayed object function block in FIG. 4F, this segment of colors displayed completely different and uniformly distributed in order (or may considered to be uniformly distributed by default) in the configured color band is added to the to-be-displayed object function block.

It is to be noted that the color band formed after the vector configuration may be directly dragged to any position of the to-be-displayed object color mapping function block. For example, when two colors already exist in the to-be-displayed object color mapping function block after the previous configuration, if a new color band needs to be added, the new color band may be directly inserted between the two colors.

Additionally, it is to be noted that if the rear segment of color information after the vector configuration covers the front segment of color information, priority judgement may be performed on the two segments of color information, and the criteria for the priority judgement may be set by those skilled in the art. The rear segment of color information covering the front segment of color information refers to that in a color selection process, the rear segment of track covers the front segment of track during moving the mouse or sliding the finger to determine the color selection track. To avoid that a mapping relationship between one color and multiple pieces of to-be-displayed object information appears, the priority judgement needs to be performed on the rear segment of colors and the front segment of colors.

In S450, the to-be-displayed object color mapping function block is determined according to the to-be-displayed object function block configured with the color information, where the to-be-displayed object color mapping function block is used for displaying the mapping relationship between the color information and the to-be-displayed object information of the to-be-displayed object on the current display interface.

In S460, the mapping relationship between the color information and the to-be-displayed object information in the to-be-displayed object color mapping function block is acquired, and a to-be-displayed object color mapping table is generated according to the mapping relationship.

Exemplarily, after the mapping relationship between the color information and the to-be-displayed object information in the to-be-displayed object color mapping function block is determined, the color information is denoted as a numerical value, and the mapping relationship table corresponding to the color information and the to-be-displayed object information is generated and stored to facilitate the subsequent color configuration. The manner for expressing the color information as the numerical value may be the common RGB representation and HLS representation, which is not limited in this embodiment.

In S470, color information of the to-be-displayed object information is configured based on the to-be-displayed object color mapping table.

In S480, the to-be-displayed object information and the color information are parsed to obtain a subpixel information component of a display interface.

In S490, a display color of the sampled to-be-displayed object is configured on the display interface according to the subpixel information component of the display interface.

According to the technical solution of the embodiment of the present application, a selection interface of the color information is provided, where the selection interface has the complete color information, a preset to-be-displayed object color mapping function block is provided, and the mapping relationship between the selected colors and the to-be-displayed object information which can be distinguished by different colors can be displayed on the display interface of the display device in real time according to the configuration mode. In this way, the color information displayed by the to-be-displayed object can be freely selected and the mapping relationship between the selected color information and the to-be-displayed object can be displayed in real time in the display interface, thereby facilitating the user operation and improving the user experience.

Figure 5A:
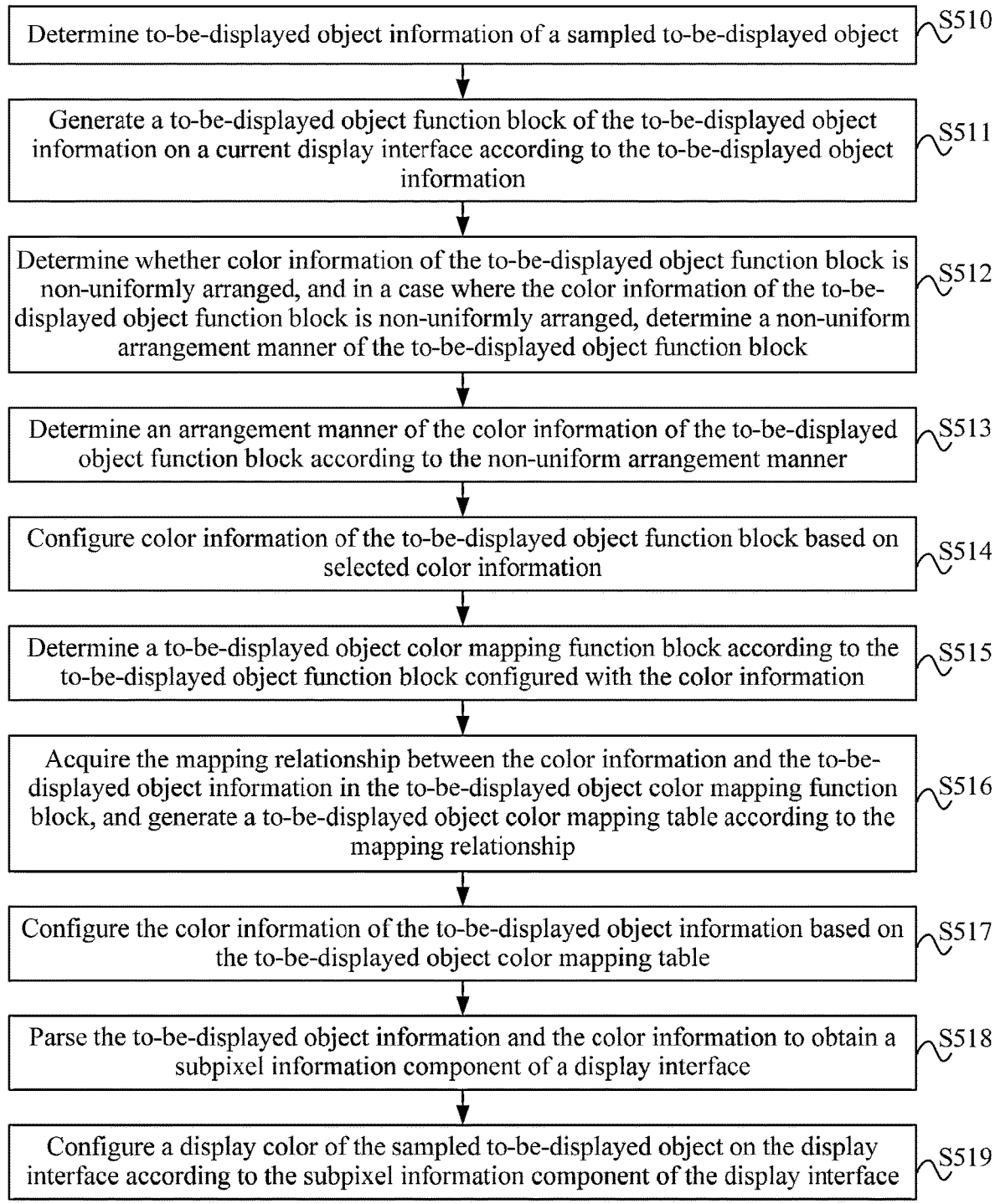
FIG. 5A is a flowchart of another color generation method of a to-be-displayed object according to an embodiment of the present application.

FIG. 5A is a flowchart of another color control method of a to-be-displayed object according to an embodiment of the present application. The technical solution of this embodiment of the present application makes optimization based on the preceding embodiments. The method of this embodiment includes steps S510 to S519.

In S510, to-be-displayed object information of a sampled to-be-displayed object is determined.

In S511, a to-be-displayed object function block of the to-be-displayed object information is generated on a current display interface according to the to-be-displayed object information.

In S512, whether color information of the to-be-displayed object function block is non-uniformly arranged is determined, and in a case where the color information of the to-be-displayed object function block is non-uniformly arranged, a non-uniform arrangement manner of the to-be-displayed object function block is determined.

Exemplarily, the color information of a to-be-displayed object interface is uniformly arranged, that is, the color information is configured in a completely linear and uniform manner. As can be seen in FIG. 3C, the span of all color information is in a linear relationship with the to-be-displayed object information, and generally, such a linear relationship may be used as a default option.

To completely freely perform a mapping relationship between the to-be-displayed object information and the color information, this embodiment of the present application may also support the non-uniform distribution. Two options may be provided for the non-uniform distribution, which are a recommended non-uniform arrangement manner and a manual non-uniform arrangement manner, respectively.

In S513, an arrangement manner of the color information of the to-be-displayed object function block is determined according to the non-uniform arrangement manner.

In an embodiment, the non-uniform arrangement manner is the manual non-uniform arrangement manner.

The step in which the arrangement manner of the color information of the to-be-displayed object interface is determined according to the non-uniform arrangement manner includes the step described below.

A proportional relationship of the color information of the to-be-displayed object interface is adjusted through a manual operation, and the arrangement manner of the color information of the to-be-displayed object interface is determined according to the proportional relationship of the color information.

Alternatively, a proportional relationship of the to-be-displayed object information of the to-be-displayed object interface is adjusted through a manual operation, and the arrangement manner of the color information of the to-be-displayed object interface is determined according to the proportional relationship of the to-be-displayed object information.

Exemplarily, the manual non-uniform arrangement manner may adjust the color information in the to-be-displayed object, and may also adjust the proportional relationship of the to-be-displayed object information, which is not limited in this embodiment.

The manual non-uniform arrangement manner may be completed by dragging the mouse or through the screen touch gesture. Exemplarily, the manual non-uniform arrangement manner is illustrated by using the waveform probability information of the oscilloscope as an example. The manual non-uniform arrangement manner may fix the proportion of the waveform probability information and adjust the color information of the to-be-displayed object interface, and may also fix the color information of the to-be-displayed object interface and adjust the proportion of the waveform probability information.

Figure 5B:
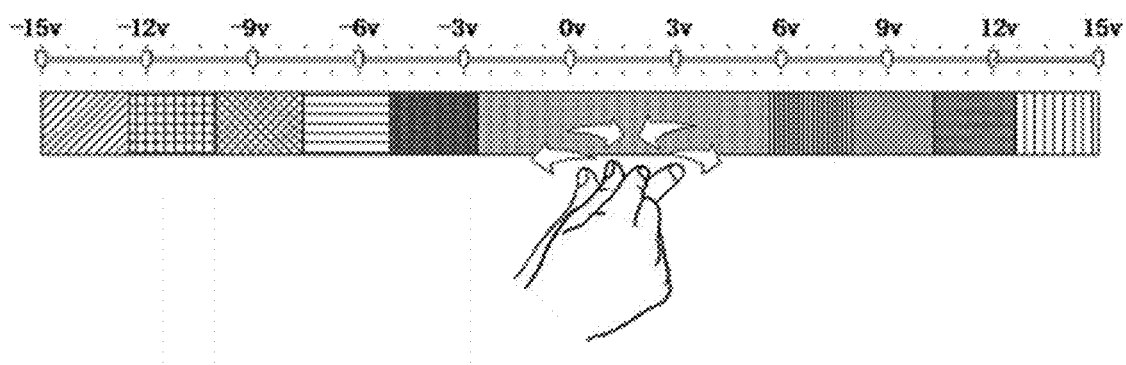
FIG. 5B is a schematic view of a result of adjusting color information of a to-be-displayed object interface in an exemplary manual non-uniform arrangement manner according to an embodiment of the present application.

It is to be noted that through the manual non-uniform arrangement manner, the proportional relationship of the color information may be randomly changed. FIG. 5B is a schematic view of a result of adjusting color information of a to-be-displayed object interface in an exemplary manual non-uniform arrangement manner according to an embodiment of the present application. As shown in FIG. 5B, those skilled in the art may zoom in on the range of a certain piece of color information of the to-be-displayed object interface by using a screen touch gesture while other color ranges are still uniformly distributed, and the final non-uniform distribution result is shown in FIG. 5B.

In an embodiment, the non-uniform arrangement manner is the recommended non-uniform arrangement manner.

The step in which the arrangement manner of the color information of the to-be-displayed object interface is determined according to the non-uniform arrangement manner includes the step described below.

A proportional relationship of the color information of the to-be-displayed object interface is adjusted through the recommended non-uniform arrangement manner based on the color information and the to-be-displayed object information, and the arrangement manner of the color information of the to-be-displayed object interface is determined according to the proportional relationship of the color information.

Exemplarily, the display device comprehensively analyzes the color information of the to-be-displayed object interface and the to-be-displayed object information and then recommends an arrangement manner of the color information of the to-be-displayed object interface, that is, the recommended non-uniform arrangement manner. The arrangement manners range from color distribution rules that are familiar to those skilled in the art in the big data to some relatively conventional arrangement manners.

In an embodiment, the recommended non-uniform arrangement manner includes a Gaussian arrangement manner, a Cauchy arrangement manner or a chi-square arrangement manner.

Exemplarily, the recommended non-uniform arrangement manner being the Gaussian arrangement manner is taken as an example. The Gaussian arrangement manner is implemented by means of a Gaussian distribution which is also known as the normal distribution. If the random variable X obeys a normal distribution with the mathematical expectation $\mu$ and the variance $\sigma^2$, the normal distribution thus is denoted as $N(\mu, \sigma^2)$. The expected value $\mu$ of the normal distribution determines the position of the probability density function of the normal distribution, and the standard deviation $\sigma$ determines the magnitude of the distribution of the probability density function. When $\mu=0$ and $\sigma=1$, the normal distribution is the standard normal distribution.

The density function of the normal distribution is as follows:

$$f(x) = \frac{1}{\sigma\sqrt{2\pi}} e^{-\frac{(x-\mu)^2}{2\sigma^2}}.$$

The numerical characteristic is as follows:

$E(X)=\mu, \mathrm{Var}(X)=\sigma^2$.

Figure 5C:
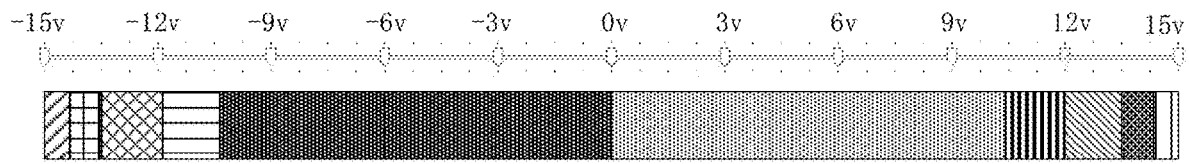
FIG. 5C is a schematic view of a result of adjusting color information of a to-be-displayed object interface in an exemplary recommended non-uniform arrangement manner according to an embodiment of the present application.

Exemplarily, 10 colors existing in the to-be-displayed object interface is taken as an example. Referring to FIG. 5C, FIG. 5C is a schematic view of a result of adjusting color information of a to-be-displayed object interface in an exemplary recommended non-uniform arrangement manner according to an embodiment of the present application.

In S514, color information of the to-be-displayed object function block is configured based on selected color information.

In S515, a to-be-displayed object color mapping function block is determined according to the to-be-displayed object function block configured with the color information, where the to-be-displayed object color mapping function block is used for displaying the mapping relationship between the color information and the to-be-displayed object information of the to-be-displayed object on the current display interface.

In S516, the mapping relationship between the color information and the to-be-displayed object information in the to-be-displayed object color mapping function block is acquired, and a to-be-displayed object color mapping table is generated according to the mapping relationship.

In S517, the color information of the to-be-displayed object information is configured based on the to-be-displayed object color mapping table.

In S518, the to-be-displayed object information and the color information are parsed to obtain a subpixel information component of a display interface.

In S519, a display color of the sampled to-be-displayed object is configured on the display interface according to the subpixel information component of the display interface.

According to the technical solution of the embodiment of the present application, commonly-used non-uniform distribution rules are intelligently recommended. This operation is simple and convenient to perform, and avoids the problem in related art that the configuration requires knowledge of color composition or that the configuration is tedious and time-consuming. Moreover, this technical solution provides rich color configuration, giving users maximum freedom and convenience, and also provides the corresponding algorithm as the support, ensuring the implementation of functions.

Figure 6:
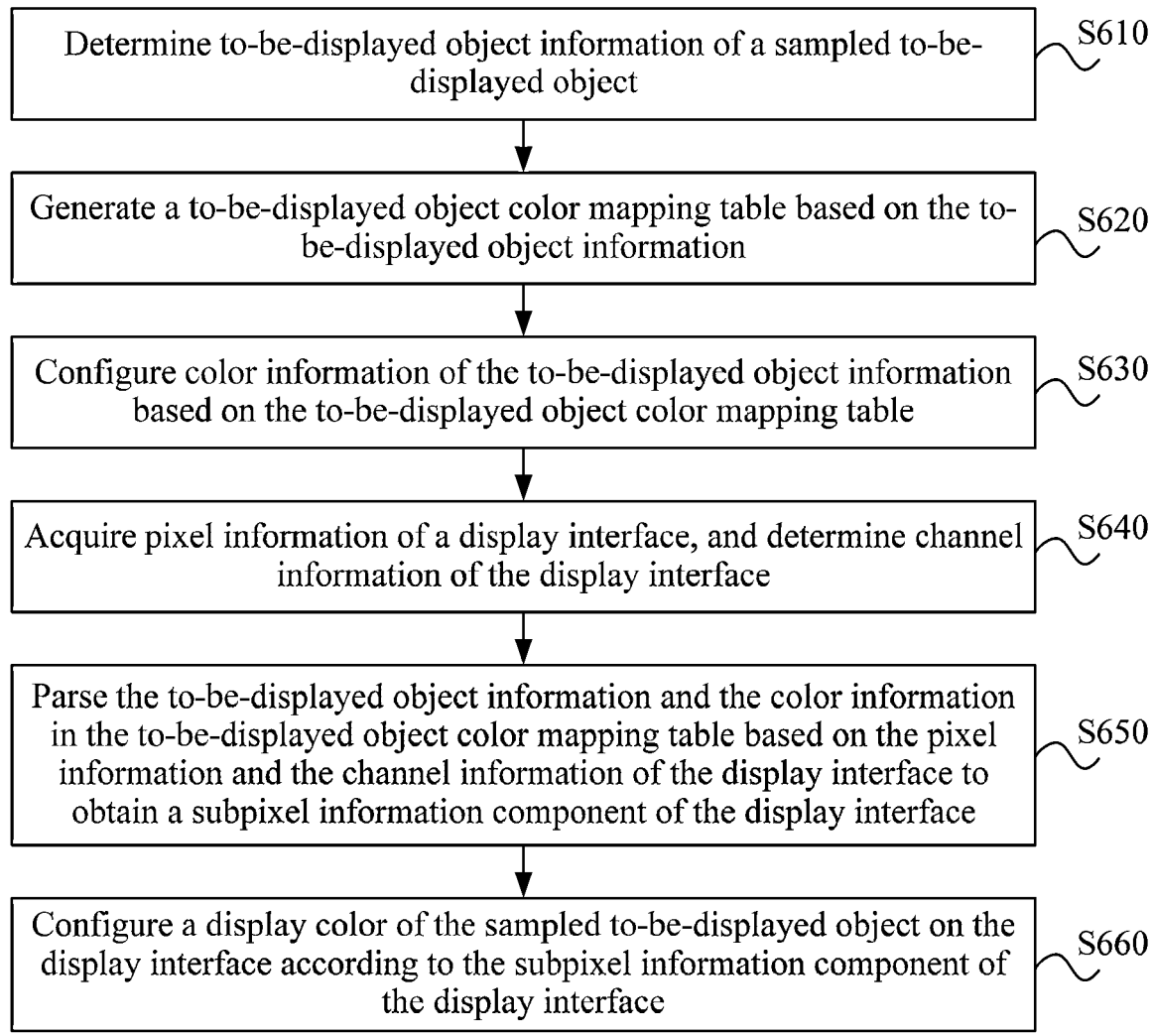
FIG. 6 is a flowchart of another color generation method of a to-be-displayed object according to an embodiment of the present application.

FIG. 6 is a flowchart of another color generation method of a to-be-displayed object according to an embodiment of the present application. The technical solution of this embodiment of the present application makes optimization based on the preceding embodiments. The method of this embodiment includes steps S610 to S660.

In S610, to-be-displayed object information of a sampled to-be-displayed object is determined.

In S620, a to-be-displayed object color mapping table is generated based on the to-be-displayed object information.

In S630, color information of the to-be-displayed object information is configured based on the to-be-displayed object color mapping table.

In S640, pixel information of a display interface is acquired, and channel information of the display interface is determined.

In S650, the to-be-displayed object information and the color information in the to-be-displayed object color mapping table are parsed based on the pixel information and the channel information of the display interface to obtain a subpixel information component of the display interface.

In S660, a display color of the sampled to-be-displayed object is configured on the display interface according to the subpixel information component of the display interface.

According to the technical solution of the embodiment of the present application, through the channel information of the display interface, the complex operation is simplified to a simple multiply-accumulate operation, and then the operation of the display color of the sampled to-be-displayed object and the subpixel information of the display interface can be quickly completed in real time. This embodiment can save a lot of resources and the cost of hardware compared with the conventional method, which needs a lot of storage resources to store mapping tables generated as the brightness is mapped into different colors. Meanwhile, the technical solution of the embodiment provides rich color configuration if the instrument hardware (such as a display screen and a video card) allows, and the most comprehensive color configuration can be completed. For whether the RGB color space, the HLS color space and the HVB color space, or the YCrCb color space and the CMYK color space, the configuration can be completed and the operation can be simplified through the calculation of the subpixel information component, and the transplanting and upgrading can be performed conveniently.

Figure 7:
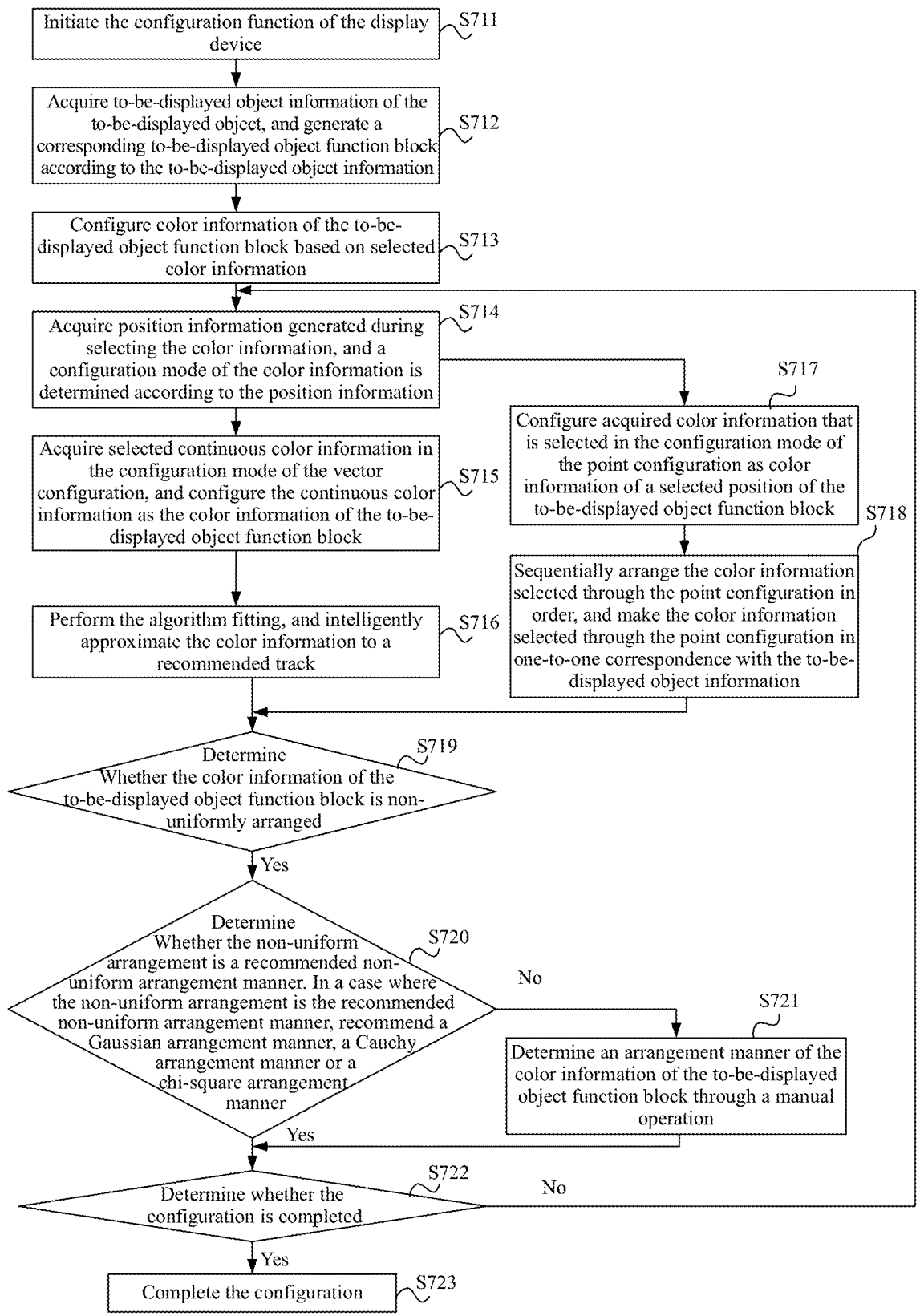
FIG. 7 is a flowchart of another color generation method of a to-be-displayed object according to an embodiment of the present application.

FIG. 7 is a flowchart of another color generation method of a to-be-displayed object according to an embodiment of the present application. The color generation method of a to-be-displayed object includes S711 to S723.

In S711, the configuration function of the display device is initiated.

In S712, to-be-displayed object information of the to-be-displayed object is acquired, and a corresponding to-be-displayed object function block is generated according to the to-be-displayed object information.

In S713, color information of the to-be-displayed object function block is configured based on selected color information. A to-be-displayed object color mapping function block is determined according to the to-be-displayed object function block configured with the color information, where the to-be-displayed object color mapping function block is used for configuring a mapping relationship between the color information and the to-be-displayed object information of the to-be-displayed object on a current display interface.

In step S714, position information generated during selecting the color information is acquired, a configuration mode of the color information is determined according to the position information, and in a case where the configuration mode is vector configuration, S715 is performed, and in a case where the configuration mode is point configuration, S717 is performed.

In step S715, selected continuous color information is acquired in the configuration mode of the vector configuration, and the continuous color information is configured as the color information of the to-be-displayed object function block.

In step S716, the algorithm fitting is performed, the color information is intelligently approximated to a recommended track, and S719 is performed.

In step S717, acquired color information that is selected in the configuration mode of the point configuration is configured as color information of a selected position of the to-be-displayed object function block.

In S718, the color information selected through the point configuration is sequentially arranged in order and is in one-to-one correspondence with the to-be-displayed object information, and S719 is performed.

In S719, whether the color information of the to-be-displayed object function block is non-uniformly arranged is determined. In a case where the color information of the to-be-displayed object function block is non-uniformly arranged, S720 is performed; while in a case where the color information of the to-be-displayed object function block is not non-uniformly arranged, S722 is performed.

In S720, whether the non-uniform arrangement is a recommended non-uniform arrangement manner is determined. In a case where the non-uniform arrangement is the recommended non-uniform arrangement manner, a Gaussian arrangement manner, a Cauchy arrangement manner or a chi-square arrangement manner is recommended; while in a case where the non-uniform arrangement is not the recommended non-uniform arrangement manner, S721 is performed.

In S721, an arrangement manner of the color information of the to-be-displayed object function block is determined through a manual operation.

In S722, whether the configuration is completed is determined. In a case where the configuration is completed, S723 is performed; while in a case where the configuration is not completed, S714 is performed.

In S723, the configuration is completed.

According to the technical solution of the embodiment of the present application, the information that can be distinguished by displayed colors in the to-be-displayed object information monitored by the measuring device may be processed through the color mapping relationship. Different from the related art in which the display of the to-be-displayed object information requires performing multi-step operations, in the present application, the to-be-displayed object information can be perceived directly according to colors, the correspondence rules between the color information and the to-be-displayed object information are very free, one-to-one correspondence is not required, and the corresponding between the colors and the to-be-displayed object information may also be completed through the mouse, the touch screen and gestures, so that the display is more direct and highly free. Additionally, the most comprehensive color configuration can be completed without increasing cost on the premise that the hardware conditions (such as a display screen and a video card) of the display device allow.

Figure 8:
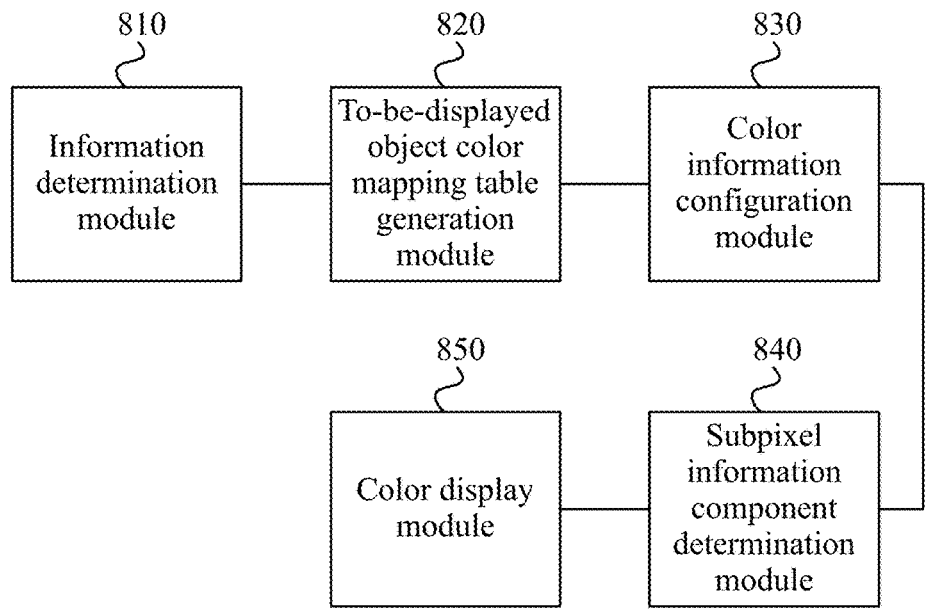
FIG. 8 is a structural diagram of a color generation apparatus of a to-be-displayed object according to an embodiment of the present application.

FIG. 8 is a structural diagram of a color generation apparatus of a to-be-displayed object according to an embodiment of the present application. This embodiment is applicable to the case where the to-be-displayed object information of the display device and the color information of the to-be-displayed object information may be freely set.

As shown in FIG. 8, the apparatus includes an information determination module 810, a to-be-displayed object color mapping table generation module 820, a color information configuration module 830, a subpixel information component determination module 840 and a color display module 850.

The information determination module 810 is configured to determine to-be-displayed object information of a sampled to-be-displayed object.

The to-be-displayed object color mapping table generation module 820 is configured to generate a to-be-displayed object color mapping table based on the to-be-displayed object information.

The color information configuration module 830 is configured to configure color information of the to-be-displayed object information based on the to-be-displayed object color mapping table.

The subpixel information component determination module 840 is configured to parse the to-be-displayed object information and the color information to obtain a subpixel information component of a display interface.

The color display module 850 is configured to configure a display color of the sampled to-be-displayed object on the display interface according to the subpixel information component of the display interface.

According to the color generation apparatus of a to-be-displayed object of this embodiment, to-be-displayed object information of a sampled to-be-displayed object is obtained, a to-be-displayed object color mapping table is generated based on the to-be-displayed object information, color information of the to-be-displayed object information is configured based on the to-be-displayed object color mapping table, the to-be-displayed object information and the color information are parsed to obtain a subpixel information component of a display interface, and a display color of the sampled to-be-displayed object is configured on the display interface according to the subpixel information component of the display interface. According to the technical solution, the situation is avoided that the color display configuration of the to-be-displayed object in the related art is limited and is not flexible and free enough, the mapping relationship between the to-be-displayed object and colors is quickly generated, the mapping between the to-be-displayed object and the colors is accelerated overall, and the occupied amount of resources and bandwidths is reduced.

The step in which the to-be-displayed object color mapping table is generated based on the to-be-displayed object information includes steps described below.

A to-be-displayed object function block of the to-be-displayed object information is generated on a current display interface according to the to-be-displayed object information.

Color information of the to-be-displayed object function block is configured based on selected color information.

A to-be-displayed object color mapping function block is determined according to the to-be-displayed object function block configured with the color information, where the to-be-displayed object color mapping function block is used for displaying a mapping relationship between the color information and the to-be-displayed object information of the to-be-displayed object on the current display interface.

The mapping relationship between the color information and the to-be-displayed object information in the to-be-displayed object color mapping function block is acquired, and the to-be-displayed object color mapping table is generated according to the mapping relationship.

The step in which the color information of the to-be-displayed object function block is configured based on the color information includes steps described below.

Position information generated during selecting the color information is acquired, and a configuration mode of the color information is determined according to the position information.

The color information of the to-be-displayed object function block is configured based on the configuration mode.

Before the position information generated during selecting the color information is acquired, the step described below is further included.

An offset threshold of the configuration mode is determined according to a selection interface of the color information and a color scale of the color information in the selection interface.

The step in which the position information generated during selecting the color information is acquired, and the configuration mode of the color information is determined according to the position information includes steps described below.

The position information generated during selecting the color information is acquired, and a position offset generated during selecting the color information is determined according to the position information.

The configuration mode of the color information is determined according to the position offset and the offset threshold.

The step in which the configuration mode of the color information is determined according to the position offset and the offset threshold includes the step described below.

Whether the position offset is less than the offset threshold is determined, and in a case where the position offset is less than the offset threshold, the configuration mode is point configuration.

The step in which the color information of the to-be-displayed object function block is configured based on the configuration mode includes the step described below.

Acquired color information that is selected in the configuration mode of the point configuration is configured as color information of a selected position of the to-be-displayed object function block.

The step in which the configuration mode of the color information is determined according to the position offset and the offset threshold includes the step described below.

Whether the position offset is greater than the offset threshold is determined, and in a case where the position offset is greater than the offset threshold, the configuration mode is vector configuration.

The step in which the color information of the to-be-displayed object function block is configured based on the configuration mode includes the step described below.

Selected continuous color information is acquired in the configuration mode of the vector configuration, and the continuous color information is configured as the color information of the to-be-displayed object function block.

Before the color information of the to-be-displayed object function block is configured based on the color information, steps described below are further included.

Whether the color information of the to-be-displayed object function block is non-uniformly arranged is determined, and in a case where the color information of the to-be-displayed object function block is non-uniformly arranged, a non-uniform arrangement manner of the to-be-displayed object function block is determined.

An arrangement manner of the color information of the to-be-displayed object function block is determined according to the non-uniform arrangement manner.

The non-uniform arrangement manner is a manual non-uniform arrangement manner.

The step in which the arrangement manner of the color information of the to-be-displayed object function block is determined according to the non-uniform arrangement manner includes the step described below.

A proportional relationship of the color information of the to-be-displayed object function block is adjusted through a manual operation, and the arrangement manner of the color information of the to-be-displayed object function block is determined according to the proportional relationship of the color information.

Alternatively, a proportional relationship of the to-be-displayed object information of the to-be-displayed object function block is adjusted through a manual operation, and the arrangement manner of the color information of the to-be-displayed object function block is determined according to the proportional relationship of the to-be-displayed object information.

The non-uniform arrangement manner is a recommended non-uniform arrangement manner.

The step in which the arrangement manner of the color information of the to-be-displayed object function block is determined according to the non-uniform arrangement manner includes the step described below.

A proportional relationship of the color information of the to-be-displayed object function block is adjusted through the recommended non-uniform arrangement manner based on the color information and the to-be-displayed object information, and the arrangement manner of the color information of the to-be-displayed object function block is determined according to the proportional relationship of the color information.

The recommended non-uniform arrangement manner includes a Gaussian arrangement manner, a Cauchy arrangement manner or a chi-square arrangement manner.

Before the to-be-displayed object information and the color information in the to-be-displayed object color mapping table are parsed to obtain the subpixel information component of the display interface, the step described below is further included.

Pixel information of the display interface is acquired, and channel information of the display interface is determined.

The step in which the to-be-displayed object information and the color information are parsed to obtain the subpixel information component of the display interface includes the step described below.

The to-be-displayed object information and the color information in the to-be-displayed object color mapping table are parsed based on the pixel information and the channel information of the display interface to obtain the subpixel information component of the display interface.

Figure 9:
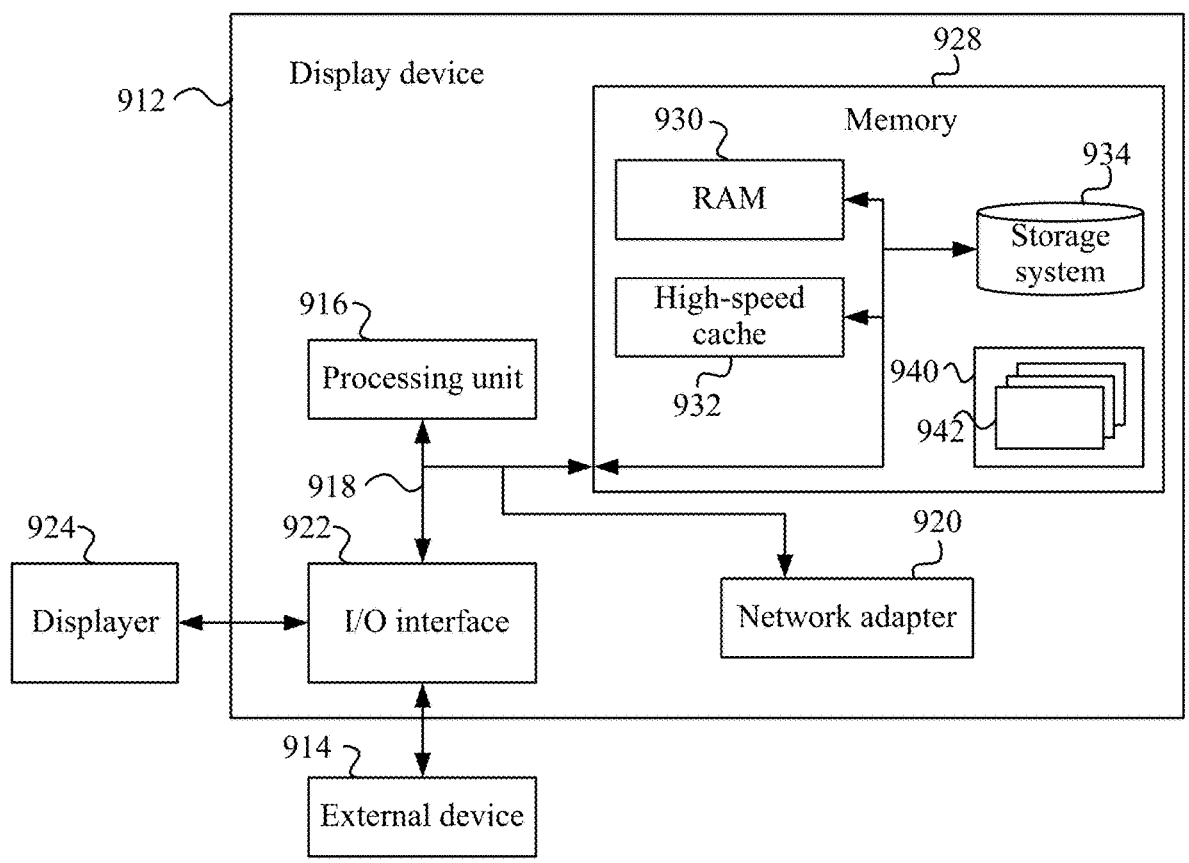
FIG. 9 is a hardware structural diagram of a display device according to an embodiment of the present application.

The color generation apparatus of a to-be-displayed object provided in the preceding embodiments may execute the color generation method of a to-be-displayed object provided in any embodiment of the present application. FIG. 9 is a structural diagram of a display device according to an embodiment of the present application. FIG. 9 shows a block diagram of an exemplary display device 912 applicable to implementing the embodiments of the present application. The display device 912 shown in FIG. 9 is merely an example and is not intended to limit the function and use scope of the embodiments of the present application.

As shown in FIG. 9, the display device 912 may take the form of a general-purpose computing device. Components of the display device 912 may include, but are not limited to, at least one processor or processing unit 916, a memory 928, and a bus 918 connecting different system components (including the system memory 928 and the at least one processing unit 916).

The bus 918 represents one or more of several types of bus architectures, including a memory bus or memory controller, a peripheral bus, an Accelerated Graphics Port and a processor, or represents a local bus using any one of multiple bus architectures. For example, these architectures include, but are not limited to, an Industry Standard Architecture (ISA) bus, a Micro Channel architecture (MAC) bus, an enhanced ISA bus, a Video Electronics Standards Association (VESA) local bus and a Peripheral Component Interconnect (PCI) bus.

The display device 912 typically includes multiple types of computer system readable media. These media may be available media that can be accessed by the display device 912. These media include volatile and non-volatile media, and removable and non-removable media.

The memory 928 may include a computer system readable medium in the form of a volatile memory, such as a random-access memory (RAM) 930 and/or a high-speed cache memory 932. The display device 912 may include other removable/non-removable, volatile/non-volatile computer system storage media. By way of example only, the storage system 934 may be configured to read from and write to non-removable, non-volatile magnetic media (not shown in FIG. 9, generally referred to as a "hard disk driver"). Although not shown in FIG. 9, can provide not only a magnetic disk driver for performing reading and writing on a removable non-volatile magnetic disk (for example, a "floppy disk"), but also an optical disc driver for performing reading and writing on a removable non-volatile optical disc (such as a compact disc read-only memory (CD-ROM), a digital video disc-read only memory (DVD-ROM) or other optical media) may be provided. In these cases, each driver may be connected to the bus 918 via one or more data media interfaces. The memory 928 may include at least one program product having a group of program modules (for example, at least one program module). These program modules are configured to perform functions of various embodiments of the present application.

A program/utility 940 having a group of program modules 942 (at least one program module 942) may be stored in the memory 928. Such program modules 642 include, but are not limited to, an operating system, at least one application program, other program modules and program data. Each or some combination of these examples may include implementation of a network environment. The program modules 942 generally perform functions and/or methods in the embodiments of the present application.

The display device 912 may also communicate with at least one external device 914 (for example, a keyboard, a pointing device, a displayer 924, etc.). The display device 912 may also communicate with at least one device that enables a user to interact with the display device 912 and/or communicate with any device (for example, a network card, a modem, etc.) that enables the display device 912 to communicate with at least one of other computing devices. Such communication may be performed through an input/output (I/O) interface 922. Moreover, the display device 912 may also communicate with at least one network (for example, a local area network (LAN), a wide area network (WAN), and/or a public network such as the Internet) through a network adapter 920. As shown in the figure, the network adapter 920 communicates with other modules of the display device 912 via the bus 918. It is to be understood that although not shown in the figure, other hardware and/or software modules may be used in conjunction with the display device 912. The other hardware and/or software modules include, but are not limited to, microcode, a device driver, a redundant processor, an external disk drive array, a redundant arrays of independent disks (RAID) system, a tape driver, a data backup storage system and the like.

The at least one processing unit 916 executes a program stored in the memory 928 to perform various functional applications and data processing, for example, to implement the color generation method of a to-be-displayed object provided in the embodiments of the present application. The color generation method of a to-be-displayed object includes steps described below.

To-be-displayed object information of a sampled to-be-displayed object is determined.

A to-be-displayed object color mapping table is generated based on the to-be-displayed object information.

Color information of the to-be-displayed object information is configured based on the to-be-displayed object color mapping table.

The to-be-displayed object information and the color information are parsed to obtain a subpixel information component of a display interface.

A display color of the sampled to-be-displayed object is configured on the display interface according to the subpixel information component of the display interface.

Of course, it is to be understood by those skilled in the art that the processor may also implement technical solutions of the color generation method of a to-be-displayed object provided in any embodiment of this application.

An embodiment of the present application further provides a non-transitory computer-readable storage medium configured to store a computer program. The program, when executed by a processor, implements the color generation method of a to-be-displayed object provided in the embodiments of the present application. The color generation method of a to-be-displayed object includes steps described below.

To-be-displayed object information of a sampled to-be-displayed object is determined.

A to-be-displayed object color mapping table is generated based on the to-be-displayed object information.

Color information of the to-be-displayed object information is configured based on the to-be-displayed object color mapping table.

The to-be-displayed object information and the color information are parsed to obtain a subpixel information component of a display interface.

A display color of the sampled to-be-displayed object is configured on the display interface according to the subpixel information component of the display interface.

Of course, in the computer-readable storage medium provided in the embodiments of the present application, the computer program stored thereon implements not only the preceding method operations but also related operations in the color generation method of a to-be-displayed object provided in any embodiment of the present application.

The computer storage medium in the embodiments of the present application may use any combination of at least one computer-readable medium. The computer-readable medium may be a computer-readable signal medium or a computer-readable storage medium. The computer-readable storage medium may be, but is not limited to, an electronic, magnetic, optical, electromagnetic, infrared, or semiconductor system, apparatus, or device, or any combination thereof. More specific examples (a non-exhaustive list) of the computer-readable storage medium include: an electrical connection having at least one wire, a portable computer magnetic disk, a hard disk, a random-access memory (RAM), a read-only memory (ROM), an erasable programmable read-only memory (EPROM or flash memory), an optical fiber, a compact disc read-only memory (CD-ROM), an optical memory device, a magnetic memory device, or any suitable combination thereof. In this document, the computer-readable storage medium may be any tangible medium including or storing a program. The program may be used by or used in conjunction with an instruction execution system, apparatus, or device.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable medium may send, propagate, or transmit a program used by or used in conjunction with an instruction execution system, apparatus, or device.

The program codes contained on the computer-readable medium may be transmitted on any suitable medium, including, but not limited to, the wireless, a wire, an optical cable, a radio frequency (RF), or any suitable combination thereof.

Computer program codes for performing the operations of the present application may be written in one or more programming languages or a combination thereof, the programming languages including object-oriented programming languages such as Java, Smalltalk and C++ and further including conventional procedural programming languages such as C programming language or similar programming languages. The program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or WAN, or may be connected to an external computer (for example, via the Internet through an Internet service provider).

What is claimed is:

1. A color generation method of a to-be-displayed object, performed by a processor and comprising:
   determining to-be-displayed object information of a sampled to-be-displayed object;
   generating a to-be-displayed object color mapping table based on the to-be-displayed object information;
   determining color information of the to-be-displayed object information based on the to-be-displayed object color mapping table;
   parsing the to-be-displayed object information and the color information to obtain a subpixel information component of a display interface; and
   determining a display color of the sampled to-be-displayed object to be displayed on the display interface according to the subpixel information component of the display interface,
   wherein generating the to-be-displayed object color mapping table based on the to-be-displayed object information comprises:
   generating on the display interface a to-be-displayed object function block of the to-be-displayed object information according to the to-be-displayed object information, wherein the to-be-display object function block is used for presenting different block areas corresponding to different intervals of the to-be-displayed object information;
   selecting color information on a selection interface of the color information, configuring color information of the to-be-displayed object function block based on the selected color information;
   determining a to-be-displayed object color mapping function block according to the to-be-displayed object function block configured with the color information, wherein the to-be-displayed object color mapping function block is used for presenting on the display interface a mapping relationship between the color information and the to-be-displayed object information of the to-be-displayed object; and
   acquiring the mapping relationship between the color information and the to-be-displayed object information in the to-be-displayed object color mapping function block, and generating the to-be-displayed object color mapping table according to the mapping relationship.

2. The method according to claim 1, wherein configuring the color information of the to-be-displayed object function block based on the selected color information comprises:
   acquiring position information generated during selecting the color information, and determining a configuration mode of the color information according to the position information; and
   configuring the color information of the to-be-displayed object function block based on the configuration mode.

3. The method according to claim 2, wherein before determining the configuration mode of the color information according to the position information, the method further comprises:

determining an offset threshold of the configuration mode according to the selection interface of the color information and a color scale of the color information in the selection interface.

4. The method according to claim 3, wherein acquiring the position information generated during selecting the color information, and determining the configuration mode of the color information according to the position information comprises:

acquiring the position information generated during selecting the color information, and determining, according to the position information, a position offset generated during selecting the color information; and determining the configuration mode of the color information according to the position offset and the offset threshold.

5. The method according to claim 4, wherein determining the configuration mode of the color information according to the position offset and the offset threshold comprises:

determining whether the position offset is less than the offset threshold, and in a case where the position offset is less than the offset threshold, determining that the configuration mode is point configuration; and wherein configuring the color information of the to-be-displayed object function block based on the configuration mode comprises:

configuring acquired color information that is selected in the configuration mode of the point configuration as color information of a selected position of the to-be-displayed object function block.

6. The method according to claim 4, wherein determining the configuration mode of the color information according to the position offset and the offset threshold comprises:

determining whether the position offset is greater than the offset threshold, and in a case where the position offset is greater than the offset threshold, determining that the configuration mode is vector configuration; and wherein configuring the color information of the to-be-displayed object function block based on the configuration mode comprises:

acquiring selected continuous color information in the configuration mode of the vector configuration, and configuring the continuous color information as the color information of the to-be-displayed object function block.

7. The method according to claim 1, before configuring the color information of the to-be-displayed object function block based on the selected color information, further comprising:

setting the color information of the to-be-displayed object function block to be non-uniformly arranged or uniformly arranged, and in a case where the color information of the to-be-displayed object function block is set to be non-uniformly arranged, determining a non-uniform arrangement manner of the to-be-displayed object function block; and determining an arrangement manner of the color information of the to-be-displayed object function block according to the non-uniform arrangement manner.

8. The method according to claim 7, wherein in a case where the non-uniform arrangement manner is a manual non-uniform arrangement manner, determining the arrangement manner of the color information of the to-be-displayed object function block according to the non-uniform arrangement manner comprises:

adjusting a proportional relationship of the color information of the to-be-displayed object function block through a manual operation, and determining the arrangement manner of the color information of the to-be-displayed object function block according to the proportional relationship of the color information; or adjusting a proportional relationship of the to-be-displayed object information of the to-be-displayed object function block through a manual operation, and determining the arrangement manner of the color information of the to-be-displayed object function block according to the proportional relationship of the to-be-displayed object information.

9. The method according to claim 7, wherein in a case where the non-uniform arrangement manner is a recommended non-uniform arrangement manner, determining the arrangement manner of the color information of the to-be-displayed object function block according to the non-uniform arrangement manner comprises:

adjusting a proportional relationship of the color information of the to-be-displayed object function block through the recommended non-uniform arrangement manner based on the color information and the to-be-displayed object information, and determining the arrangement manner of the color information of the to-be-displayed object function block according to the proportional relationship of the color information.

10. The method according to claim 9, wherein the recommended non-uniform arrangement manner comprises a Gaussian arrangement manner, a Cauchy arrangement manner or a chi-square arrangement manner.

11. The method according to claim 1, wherein before parsing the to-be-displayed object information and the color information to obtain the subpixel information component of the display interface, the method further comprises:

acquiring pixel information of the display interface, and determining channel information of the display interface;

wherein parsing the to-be-displayed object information and the color information to obtain the subpixel information component of the display interface comprises:

parsing to-be-displayed object information and color information in the to-be-displayed object color mapping table based on the pixel information of the display interface and the channel information of the display interface to obtain the subpixel information component of the display interface.

12. A non-transitory computer-readable storage medium storing a computer program which, when executed by a processor, implements the color generation method of a to-be-displayed object according to claim 1.

13. A display device, comprising:

at least one processor; and a storage apparatus configured to store at least one program;

wherein the at least one program, when executed by the at least one processor, causes the at least one processor to implement:

determining to-be-displayed object information of a sampled to-be-displayed object;

generating a to-be-displayed object color mapping table based on the to-be-displayed object information;

determining color information of the to-be-displayed object information based on the to-be-displayed object color mapping table;

parsing the to-be-displayed object information and the color information to obtain a subpixel information component of a display interface; and determining a display color of the sampled to-be-displayed object to be displayed on the display interface according to the subpixel information component of the display interface, wherein generating the to-be-displayed object color mapping table based on the to-be-displayed object information comprises:

generating on the display interface a to-be-displayed object function block of the to-be-displayed object information according to the to-be-displayed object information, wherein the to-be-display object function block is used for presenting different block areas corresponding to different intervals of the to-be-displayed object information;

selecting color information on a selection interface of the color information, configuring color information of the to-be-displayed object function block based on the selected color information;

determining a to-be-displayed object color mapping function block according to the to-be-displayed object function block configured with the color information, wherein the to-be-displayed object color mapping function block is used for displaying presenting on the display interface a mapping relationship between the color information and the to-be-displayed object information of the to-be-displayed object; and acquiring the mapping relationship between the color information and the to-be-displayed object information in the to-be-displayed object color mapping function block, and generating the to-be-displayed object color mapping table according to the mapping relationship.

14. The display device according to claim 13, wherein configuring the color information of the to-be-displayed object function block based on the selected color information comprises:

acquiring position information generated during selecting the color information, and determining a configuration mode of the color information according to the position information; and configuring the color information of the to-be-displayed object function block based on the configuration mode.

15. The display device according to claim 14, wherein before determining the configuration mode of the color information according to the position information, the at least one program, when executed by the at least one processor, causes the at least one processor to further implement:

determining an offset threshold of the configuration mode according to the selection interface of the color information and a color scale of the color information in the selection interface.

16. The display device according to claim 15, wherein acquiring the position information generated during selecting the color information, and determining the configuration mode of the color information according to the position information comprises:

acquiring the position information generated during selecting the color information, and determining, according to the position information, a position offset generated during selecting the color information; and determining the configuration mode of the color information according to the position offset and the offset threshold.

17. The display device according to claim 16, wherein determining the configuration mode of the color information according to the position offset and the offset threshold comprises:

determining whether the position offset is less than the offset threshold, and in a case where the position offset is less than the offset threshold, determining that the configuration mode is point configuration; and wherein configuring the color information of the to-be-displayed object function block based on the configuration mode comprises:

configuring acquired color information that is selected in the configuration mode of the point configuration as color information of a selected position of the to-be-displayed object function block.

18. The display device according to claim 16, wherein determining the configuration mode of the color information according to the position offset and the offset threshold comprises:

determining whether the position offset is greater than the offset threshold, and in a case where the position offset is greater than the offset threshold, determining that the configuration mode is vector configuration; and wherein configuring the color information of the to-be-displayed object function block based on the configuration mode comprises:

acquiring selected continuous color information in the configuration mode of the vector configuration, and configuring the continuous color information as the color information of the to-be-displayed object function block.

19. The display device according to claim 13, before configuring the color information of the to-be-displayed object function block based on the selected color information, the at least one program, when executed by the at least one processor, causes the at least one processor to further implement:

setting the color information of the to-be-displayed object function block to be non-uniformly arranged or uniformly arranged, and in a case where the color information of the to-be-displayed object function block is set to be non-uniformly arranged, determining a non-uniform arrangement manner of the to-be-displayed object function block; and determining an arrangement manner of the color information of the to-be-displayed object function block according to the non-uniform arrangement manner.

* * * * *